US008811954B1

(12) United States Patent
Mahdi et al.

(10) Patent No.: US 8,811,954 B1
(45) Date of Patent: Aug. 19, 2014

(54) NETWORK DOMAIN SELECTION

(75) Inventors: Kaniz Mahdi, Carrollton, TX (US);
Michael Leeder, Stittsville, CA (US);
Joan Smith, Orleans, CA (US)

(73) Assignee: Genband US LLC, Plano, TX (US)

( * ) Notice: Subject to any disclaimer, the term of this patent is extended or adjusted under 35 U.S.C. 154(b) by 0 days.

(21) Appl. No.: 11/554,930

(22) Filed: Oct. 31, 2006

Related U.S. Application Data

(60) Provisional application No. 60/731,676, filed on Oct. 31, 2005, provisional application No. 60/741,981, filed on Dec. 2, 2005.

(51) Int. Cl.
*H04M 3/42* (2006.01)

(52) U.S. Cl.
USPC .................................... 455/414.1; 370/338

(58) Field of Classification Search
None
See application file for complete search history.

(56) References Cited

U.S. PATENT DOCUMENTS

| | | | |
|---|---|---|---|
| 5,497,411 | A | 3/1996 | Pellerin |
| 5,978,367 | A | 11/1999 | Kinnunen et al. |
| 6,067,453 | A | 5/2000 | Adiwoso et al. |
| 6,208,627 | B1 | 3/2001 | Menon et al. |
| 6,353,596 | B1 | 3/2002 | Grossglauser et al. |
| 6,614,897 | B1 | 9/2003 | Curtis et al. |
| 6,721,565 | B1 | 4/2004 | Ejzak et al. |
| 6,801,615 | B2 | 10/2004 | Stumer et al. |
| 6,961,774 | B1 | 11/2005 | Shannon et al. |
| 6,970,459 | B1 | 11/2005 | Meier |
| 6,999,770 | B2 | 2/2006 | Hirsbrunner et al. |
| 7,099,309 | B2 | 8/2006 | Davidson |
| 7,206,582 | B2 | 4/2007 | Tom et al. |
| 7,313,666 | B1* | 12/2007 | Saminda De Silva et al. ............... 711/173 |
| 7,395,065 | B2 | 7/2008 | Dorenbosch |
| 7,477,734 | B1 | 1/2009 | Smith |
| 7,492,886 | B1 | 2/2009 | Kalmanek, Jr. et al. |

(Continued)

FOREIGN PATENT DOCUMENTS

| | | |
|---|---|---|
| CA | 2 501 991 A1 | 4/2004 |
| CN | 101292489 A | 11/2008 |

(Continued)

OTHER PUBLICATIONS

3GPP TSG-SA WG2 Meeting #46, Technical document: Tdoc S2-050995, Service Continuity—Network Domain Selection, May 13, 2006, 3GPP.*

(Continued)

*Primary Examiner* — Marcos Batista
(74) *Attorney, Agent, or Firm* — Jenkins, Wilson, Taylor & Hunt, P.A.

(57) ABSTRACT

For an incoming session intended for a user element, a domain selection function (DSF) is provided in a multimedia subsystem (MS) to select a circuit-switched subsystem (CS) or MS domain to use when routing the incoming session to the user element. Regardless of the domain in which incoming sessions are originated, the incoming sessions intended for the user element are routed to an S-CSCF in the MS. The S-CSCF directly or indirectly employs the DSF to determine whether to use the MS or the CS for terminating the incoming session. Based on available domain selection criteria, the DSF will select an appropriate domain, such as the MS or CS, to use for routing the incoming session to the user element. The domain selection decision of the DSF is provided to the S-CSCF, which will proceed by routing the incoming session to the user element via the selected domain.

12 Claims, 14 Drawing Sheets

(56) References Cited

U.S. PATENT DOCUMENTS

| | | | |
|---|---|---|---|
| 7,664,495 | B1 | 2/2010 | Bonner et al. |
| 7,729,489 | B2 | 6/2010 | Lee et al. |
| 7,792,974 | B2 | 9/2010 | Westman et al. |
| 8,045,568 | B2 | 10/2011 | Sylvain et al. |
| 8,180,338 | B1 | 5/2012 | Sylvain |
| 8,203,982 | B2 | 6/2012 | Mutikainen et al. |
| 8,208,442 | B2 | 6/2012 | Mahdi et al. |
| 8,411,673 | B2 | 4/2013 | Jin et al. |
| 8,600,006 | B2 | 12/2013 | Constantinof et al. |
| 8,644,298 | B1 | 2/2014 | Mahdi |
| 2001/0055982 | A1* | 12/2001 | Umeda ............... 455/560 |
| 2002/0037723 | A1* | 3/2002 | Roach ............... 455/435 |
| 2002/0133600 | A1 | 9/2002 | Williams et al. |
| 2002/0188562 | A1 | 12/2002 | Igarashi et al. |
| 2003/0027569 | A1 | 2/2003 | Ejzak |
| 2003/0148765 | A1 | 8/2003 | Ma et al. |
| 2003/0174688 | A1 | 9/2003 | Ahmed et al. |
| 2004/0002335 | A1 | 1/2004 | Pan et al. |
| 2004/0003046 | A1 | 1/2004 | Grabelsky et al. |
| 2004/0028080 | A1 | 2/2004 | Samarasinghe et al. |
| 2004/0062383 | A1 | 4/2004 | Sylvain |
| 2004/0067754 | A1 | 4/2004 | Gao et al. |
| 2004/0157600 | A1 | 8/2004 | Stumpert et al. |
| 2004/0219905 | A1 | 11/2004 | Blumenthal et al. |
| 2004/0229469 | A1 | 11/2004 | Marsh et al. |
| 2004/0246990 | A1 | 12/2004 | Krishnamurthi et al. |
| 2004/0249887 | A1 | 12/2004 | Garcia-Martin et al. |
| 2005/0002407 | A1 | 1/2005 | Shaheen et al. |
| 2005/0003797 | A1 | 1/2005 | Baldwin |
| 2005/0003821 | A1 | 1/2005 | Sylvain |
| 2005/0243870 | A1 | 11/2005 | Balogh et al. |
| 2005/0245261 | A1 | 11/2005 | Ejzak |
| 2005/0265304 | A1 | 12/2005 | Kim et al. |
| 2005/0286531 | A1 | 12/2005 | Tuohino et al. |
| 2006/0002355 | A1 | 1/2006 | Baek et al. |
| 2006/0002380 | A1 | 1/2006 | Bollinger et al. |
| 2006/0034270 | A1 | 2/2006 | Haase et al. |
| 2006/0035637 | A1 | 2/2006 | Westman |
| 2006/0077965 | A1* | 4/2006 | Garcia-Martin et al. ..... 370/352 |
| 2006/0083199 | A1 | 4/2006 | Yang |
| 2006/0087982 | A1 | 4/2006 | Kuure et al. |
| 2006/0094431 | A1 | 5/2006 | Saifullah et al. |
| 2006/0111114 | A1 | 5/2006 | Marin et al. |
| 2006/0111115 | A1 | 5/2006 | Marin et al. |
| 2006/0142004 | A1* | 6/2006 | He et al. ............... 455/434 |
| 2006/0187904 | A1 | 8/2006 | Oouchi |
| 2006/0198360 | A1 | 9/2006 | Biage et al. |
| 2006/0209805 | A1 | 9/2006 | Mahdi et al. |
| 2006/0217112 | A1 | 9/2006 | Mo |
| 2006/0268928 | A1* | 11/2006 | Barzegar et al. ............. 370/465 |
| 2007/0004415 | A1 | 1/2007 | Abedi |
| 2007/0014281 | A1 | 1/2007 | Kant |
| 2007/0041367 | A1 | 2/2007 | Mahdi |
| 2007/0058788 | A1 | 3/2007 | Mahdi et al. |
| 2007/0066304 | A1* | 3/2007 | Lee ............... 455/436 |
| 2007/0072605 | A1 | 3/2007 | Poczo |
| 2007/0100981 | A1 | 5/2007 | Adamczyk et al. |
| 2007/0127436 | A1 | 6/2007 | Karimi-Cherkandi et al. |
| 2007/0153736 | A1 | 7/2007 | Mow et al. |
| 2007/0206568 | A1 | 9/2007 | Silver et al. |
| 2007/0263599 | A1 | 11/2007 | Itzkovitz et al. |
| 2008/0025263 | A1 | 1/2008 | Pelkonen |
| 2008/0049725 | A1 | 2/2008 | Rasanen |
| 2008/0144518 | A1 | 6/2008 | Rosenwald et al. |
| 2008/0144637 | A1 | 6/2008 | Sylvain et al. |
| 2008/0151870 | A1 | 6/2008 | Stucker et al. |
| 2008/0160991 | A1 | 7/2008 | Constantinof et al. |
| 2008/0268818 | A1* | 10/2008 | Keller et al. ............... 455/414.1 |
| 2008/0299980 | A1 | 12/2008 | Buckley et al. |
| 2009/0111471 | A1 | 4/2009 | Li et al. |
| 2009/0190579 | A1* | 7/2009 | Witzel et al. ............... 370/353 |
| 2009/0219843 | A1 | 9/2009 | Chin et al. |
| 2009/0219924 | A1 | 9/2009 | Watanabe et al. |
| 2009/0227236 | A1 | 9/2009 | Sanchez Herrero et al. |
| 2010/0124897 | A1 | 5/2010 | Edge |
| 2011/0176680 | A1 | 7/2011 | Wu |
| 2011/0181681 | A1 | 7/2011 | Lee |
| 2013/0039337 | A1 | 2/2013 | Hwang et al. |

FOREIGN PATENT DOCUMENTS

| | | |
|---|---|---|
| CN | 102138311 A | 7/2011 |
| CN | ZL200680039435.0 | 3/2013 |
| EP | 1 920 572 A2 | 3/2007 |
| EP | 1 816 877 A1 | 8/2007 |
| EP | 1 965 592 A1 | 9/2008 |
| GB | 2 410 855 A | 8/2005 |
| WO | WO 00/60785 A1 | 10/2000 |
| WO | WO 01/03450 A1 | 1/2001 |
| WO | WO 01/22657 A1 | 3/2001 |
| WO | WO 2004/019173 A2 | 3/2004 |
| WO | WO 2004/073279 A1 | 8/2004 |
| WO | WO 2004/112415 A2 | 12/2004 |
| WO | WO 2006/097837 A1 | 9/2006 |
| WO | WO 2006/105732 A1 | 10/2006 |
| WO | WO 2006/126072 A1 | 11/2006 |
| WO | WO 2007/023358 A2 | 3/2007 |
| WO | WO 2008/038101 A2 | 4/2008 |

OTHER PUBLICATIONS

Non-Final Official Action for U.S. Appl. No. 11/378,776 (Aug. 18, 2010).
Non-Final Official Action for U.S. Appl. No. 11/440,165 (Aug. 4, 2010).
International Search Report for International Application No. PCT/IB2006/001564 (Nov. 14, 2006).
Notification of Transmittal of the International Search Report and the Written Opinion of the International Searching Authority, or the Declaration for International Application No. PCT/IB2006/001362 (Oct. 5, 2006).
"3$^{rd}$ Generation Partnership Project; Technical Specification Group Core Network and Terminals; Mobile radio interface Layer 3 specification; Core network protocols; Stage 3 (Release 7)," 3GPP TS 24.008 V7.5.0, pp. 1-538 (Sep. 2006).
"3$^{rd}$ Generation Partnership Project; Technical Specification Group Services and System Aspects; IP Multimedia Subsystem (IMS); Stage 2 (Release 7)," 3GPP TS 23.228 V7.5.0, pp. 1-214 (Sep. 2006).
International Search Report for International Application No. PCT/IB2006/000607 (Aug. 28, 2006).
Strater at al., "Seamless Mobility Between Home Networks and Cable Services," Motorola White Paper (May 27, 2005).
Notice of Allowance and Fee(s) Due for U.S. Appl. No. 11/452,743 (Nov. 7, 2011).
Notice of Panel Decision from Pre-Appeal (Nov. 3, 2011). Brief Review for U.S. Appl. No. 11/440,165 (Nov. 3, 2011).
Interview Summary for U.S. Appl. No. 11/466,115 (Oct. 18, 2011).
Official Action for U.S. Appl. No. 11/466,115 (Jul. 12, 2011).
Notice of Allowance and Fee(s) Due for U.S. Appl. No. 11/536,921 (Jun. 30, 2011).
Decision on Petition to Revive for U.S. Appl. No. 11/466,115 (Jun. 22, 2011).
Decision on Petition to Revive for U.S. Appl. No. 11/452,743 (Jun. 22, 2011).
Final Official Action for U.S. Appl. No. 11/440,165 (Jun. 22, 2011).
Notice of Abandonment for U.S. Appl. No. 11/466,115 (May 11, 2011).
Notice of Abandonment for U.S. Appl. No. 11/452,743 (Apr. 27, 2011).
Chinese Official Action for Chinese patent application No. 200680039435.0 (Mar. 22, 2011).
Final Official Action for U.S. Appl. No. 11/378,776 (Mar. 9, 2011).
Final Official Action for U.S. Appl. No. 11/616,679 (Feb. 25, 2011).
Official Action for U.S. Appl. No. 11/440,165 (Feb. 16, 2011).
Official Action for U.S. Appl. No. 11/536,921 (Dec. 3, 2010).
Non-Final Official Action for U.S. Appl. No. 11/452,743 (Oct. 13, 2010).
Final Official Action for U.S. Appl. No. 11/466,115 (Oct. 12, 2010).
Official Action for U.S. Appl. No. 11/616,679 (Aug. 13, 2010).

(56) References Cited

OTHER PUBLICATIONS

Final Official Action for U.S. Appl. No. 11/452,743 (Mar. 30, 2010).
Final Official Action for U.S. Appl. No. 11/536,921 (Mar. 4, 2010).
Official Action for U.S. Appl. No. 11/466,115 (Feb. 2, 2010).
Non-Final Official Action for U.S. Appl. No. 11/452,743 (Oct. 2, 2009).
Official Action for U.S. Appl. No. 11/536,921 (Jul. 21, 2009).
Official Action for U.S. Appl. No. 11/466,115 (Jun. 23, 2009).
Communication pursuant to Article 94(3) EPC for European Application No. 07024903.2 (Apr. 2, 2009).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0.(Dec. 2008). (Part 1 of 2, pp. 1-285).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0.(Dec. 2008). (Part 2 of 2, pp. 286-571).
Commonly-assigned, co-pending U.S. Appl. No. 12/209,829 for "Adding a Service Control Channel After Session Establishment," (Unpublished, filed Sep. 12, 2008).
European Search Report for EP 07024903 (Jul. 23, 2008).
3rd Generation Parnership Project (3GPP), "IP Multimedia Subsystem (IMS) Centralized Services," Technical Specification 3GPP TS 23.292 v8.0.0, Stage 2, Release 8, 3GPP Organization Partners (Jun. 2008).
3GPP, "3rd Generation Partnership Project; Technical SPecificarion Group Services and System Aspects; IP Miltimedia Subsystem (IMS) Centralized Services (Rlease 8)," 3 GPP TS 23.892 V8.0.1 (Mar. 2008).
International Search Report for PCT/IB2007/002787 (Mar. 7, 2008).
Notification Concerning Transmittal of International Preliminary Report on Patentability for International Application No. PCT/IB2006/002282 (Mar. 6, 2008).
3GPP, "3rd Generation Partnership Project; Technical Specification Group Services and System Aspects; IP Multimedia Subsystem (IMS); Stage 2 (Release 8)," 3GPP TS 23.228 V8.1.0 (Jun. 2007).
3GPP, "3rd Generation Partnership Project; Technical Specification Group Core Network and Terminals; Mobile Redio Interface Layer 3 Specification; Core Network Protocols; Stage 3 (Release 7)," 3GPP TS 24.008 V7.8.0 (Jun. 2007).
International Search Report for PCT/IB2006/002282 (Feb. 2, 2007).
3GPP CT WG1, "3$^{rd}$ Generation Partnership Project; Technical Specification Group Services and System Aspects; voice Call Continuity (VCC) Between Circuit Switched (CS) and IP Multimedia Subsystem (IMS); Stage 2 (Release 7), TS 23.206 V7.1.0," Technical Specification (TS), pp. 1-36 (Dec. 1, 2006).
3GPP, "3rd Generation Partnership Project; Technical Specification Group Services and System Aspects; Voice Call Continuity Between CS and IMS; Stage 2 (Release 7)," 3GPP TS 23.206 V1.1.0 (Jul. 2006).
Commonly-assigned, co-pending U.S. Appl. No. 11/452,743 for "Selective Call Anchoring in a Multimedia Subsystem," (Unpublished, filed Jun. 14, 2006).
"3rd Generation Partnership Project; Technical Specification Group Core Network and Terminals; Mobile radio interface Layer 3 specification; Core network protocols; Stage 3 (Release 7)," 3GPP TS 24.008, V7.4.0, pp. 1-534 (Jun. 2006).
3GPP, "3rd Generation Partnership Project; Technical Specification Group Services and System Aspects; Multimedia Broadcast/Multicast Service (MBMS); Architecture and Functional Description (Release 6)," 3GPP TS 23.246.V6.10.0 (Jun. 2006).
3GPP SA WG2, "Voice Call Continuity Between CS and IMS Study (3GPP TR 23.806 version 7.00.0 Release 7)," Technical Specification (TS), pp. 1-153 (Dec. 1, 2005).

3GPP, "3rd Generation Partnership Project; Technical Specification Group Services and System Aspects; Voice Call Continuity Between CS and IMS Study (Release 7)," 3GPP TR 23.806 V1.4.0 (Aug. 2005). (Part 1 of 2, pp. 1-90).
3GPP, "3rd Generation Partnership Project; Technical Specification Group Services and System Aspects; Voice Call Continuity Between CS and IMS Study (Release 7)," 3GPP TR 23.806 V1.4.0 (Aug. 2005). (Part 2 of 2, pp. 91-180).
U.S. Appl. No. 60/690,843 (Jun. 15, 2005).
3GPP, "3rd Generation Partnership Project; Universal Mobile Telecommunications System; Mobile Radio Interface Layer 3 Specification, Core Network Protocols—Stage 3," TS 24.008 V3.0.0 (Jul. 1999).
"3rd Generation Partnership Project; Technical Specification Group Services and System Aspects; Voice Call Continuity between CS and IMS; Stage 2 (Release 7)," 3GPP TS 23.206 V0.3.0, pp. 1-22 (Feb. 2006).
"Architectural Alternative for CS-IMS Voice Call Continuity Based on IMS Control," Nortel, 3GPP TSG SA WG2 Architecture—S2#45, pp. 1-9 (Apr. 4-8, 2005).
"WID for Voice Call Continuity Between CS and IMS (incl. I-WLAN)," TSG SA WG2, Technical Specification Group Services and System Aspects, pp. 1-5 (Mar. 14-17, 2005).
Notice of Allowance and Fee(s) Due for U.S. Appl. No. 11/466,115 (Feb. 21, 2012).
Non-Final Official Action for U.S. Appl. No. 11/378,776 (Jan. 20, 2012).
Non-Final Official Action for U.S. Appl. No. 11/440,165 (Jan. 19, 2012).
Non-Final Official Action for U.S. Appl. No. 12/209,829 (Dec. 1, 2011).
Extended European Search Report for European Application No. 06795307.5 (Jan. 16, 2013).
Notice of Grant for Chinese Patent Application No. 200680039435.0 (Nov. 26, 2012).
Advisory Action for U.S. Appl. No. 11/378,776 (Nov. 5, 2012).
Non-Final Official Action for U.S. Appl. No. 12/209,829 (Sep. 5, 2012).
Extended European Search Report for European Application No. 06727330.0 (Jun. 27, 2012).
Office Action for Japanese Patent Application No. 2009-529788 (Jun. 5, 2012).
Final Office Action for U.S. Appl. No. 11/378,776 (May 24, 2012).
Second Office Action for Chinese Patent Application No. 200680039435.0 (Mar. 27, 2012).
"3rd Generation Partnership Project; Technical Specification Group Services and System Aspects; Voice Call Continuity between CS and IMS Study (Release 7)," 3GPP TR 23.806, V1.5.0, pp. 1-148 (Aug. 2005).
Notice of Allowance and Fee(s) Due for U.S. Appl. No. 11/616,679 (Aug. 2, 2013).
Applicant-Initiated Interview Summary for U.S. Appl. No. 11/616,679 (Aug. 1, 2013).
Final Office Action for U.S. Appl. No. 12/209,829 (Jun. 6, 2013).
First Office Action for Chinese Patent Application No. 200780043894.0 (May 31, 2013).
Notice of Abandonment for U.S. Appl. No. 11/440,165 (Feb. 5, 2013).
Interview Summary for U.S. Appl. No. 11/378,776 (Nov. 30, 2012).
Non-Final Office Action for U.S. Appl. No. 11/378,776 (Nov. 22, 2013).
Notice of Allowance and Fee(s) Due for U.S. Appl. No. 12/209,829 (Sep. 27, 2013).
Interview Summary for U.S. Appl. No. 12/209,829 (Sep. 12, 2013).

\* cited by examiner

NETWORK DOMAIN SELECTION

This application claims the benefit of U.S. provisional patent application 60/731,676 filed Oct. 31, 2005 and U.S. provisional patent application 60/741,981 filed Dec. 2, 2005, the disclosures of which are hereby incorporated by reference in their entireties.

FIELD OF THE INVENTION

The present invention relates to communications, and in particular to domain selection in communication systems that support calls over circuit-switched subsystems and packet subsystems as well as to effecting transfers of established calls from one subsystem to another.

BACKGROUND OF THE INVENTION

Packet communications have evolved to a point where voice sessions, or calls, can be supported with essentially the same quality of service as that provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications. As such, user elements have been developed to support both cellular and WLAN communications using different communication interfaces. With these user elements, users can initiate and receive calls via the cellular network and WLAN using the respective communication interfaces of the user elements.

Based on location of the user element, incoming calls may be routed to the user element via cellular access or WLAN access. If the user element is served only by cellular access, the incoming calls should be routed via the cellular access. If the user element is served only by WLAN access, the incoming calls should be routed via the WLAN access. When the user element is currently served by both cellular and WLAN access, the incoming calls may be routed via cellular or WLAN access. Different conditions and communication requirements may warrant routing the incoming calls via cellular or WLAN access; however, existing communication environments do not provide an efficient and effective technique to control the routing of incoming calls via cellular and WLAN access to the user elements.

Accordingly, there is a need for a technique to effectively control the routing of incoming calls via cellular and WLAN access to the user elements.

SUMMARY OF THE INVENTION

For the present invention session control, including call control, for a user element is moved from a cellular network to a multimedia subsystem (MS), such as an Internet Protocol (IP) Multimedia Subsystem (IMS). As such, call control is provided by the MS regardless of whether the user element is using cellular or WLAN access for the call. For clarity and conciseness, a cellular network providing circuit-switched communications is referred to as circuit-switched subsystem (CS), and a WLAN providing packet communications is assumed to be part of or associated with the MS.

Session control for originating and terminating calls in the CS or MS as well as transferring sessions between the CS and MS is anchored at a continuity control function (CCF) in the MS. Session signaling for the call is directed to the MS and routed to an appropriate serving—call/session control function (S-CSCF), which routes the session signaling through the CCF. The CCF may be a service provided in the user element's home MS and anchors the user element's active CS calls and MS sessions to enable mobility across the CS and MS while maintaining the CS calls or MS sessions.

For an incoming session intended for the user element, a domain selection function (DSF) is provided in the MS to select the CS or MS domain to use when routing the incoming session to the user element. The DSF may be provided in a standalone service node or may be integrated with another session signaling entity, such as a home subscriber service (HSS). The DSF operates in close association with the S-CSCF and the HSS. Regardless of the domain in which incoming sessions are originated, the incoming sessions intended for the user element are routed to an S-CSCF in the MS. The S-CSCF directly or indirectly employs the DSF to determine whether to use the MS or the CS for terminating the incoming session. If the DSF is provided in the HSS, the S-CSCF may communicate directly with the HSS to determine the selected domain. If the DSF is a standalone entity, the S-CSCF may communicate with the DSF, which may interact with the HSS to determine the selected domain. Based on available domain selection criteria, the DSF will select an appropriate domain, such as the MS or CS, to use for routing the incoming session to the user element. The domain selection decision of the DSF is provided to the S-SCSF, which will proceed by routing the incoming session to the user element via the selected domain.

When the user element is only supported by one domain, the domain selected is generally the available domain. When the user element is concurrently supported by both the MS and the CS, the domain selected may be based on various domain selection criteria. The domain selection criteria may be established to fulfill the routing needs and desires of the service providers, users, or both. For example, the domain selection criteria may include any one or a combination of the following: user element registration in the MS, communication capability via the MS, user element registration in the CS, communication capability via the CS, the domain used for prior or existing calls, service provider preferences, user preferences, the capabilities of the respective MS and CS communication clients of the user element, and the type of session being established. The invention is particularly beneficial when the user element is registered in and capable of communicating via both the MS and the CS. In this case, sessions may be routed in either domain, and the DSF may use the domain selection criteria to select the most appropriate of the available domains.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. For MS calls, the CCF provides call control by interacting with the user element and a remote endpoint to establish a bearer path directly between the user element and the remote endpoint through the MS. The CCF is addressable using public service identities (PSI). In the CS, a directory number associated with the CCF is used for routing call signaling messages within the CS. In the MS, a uniform resource location (URL) associated with the CCF is used for routing call signaling messages within the MS.

Subsystem transfers enable the user element to move between the CS and the MS while maintaining one or more active calls. Call transfers associated with a given call, including initial and subsequent transfers, are executed and controlled in the home MS by the CCF, generally upon a request received from the user element. To enable such transfers, the CCF is inserted into the signaling path of the calls by a serving call/session control function (S-CSCF). To anchor the signaling path, the CCF will employ a back-to-back user agent function, which may operate as follows. When the user element originates a call, the CCF will terminate an access signaling leg from the user element and establish a remote signaling leg toward the remote endpoint. When terminating a call at the user element, the CCF will terminate a remote signaling leg from the remote endpoint and establish an access signaling leg toward the user element. Subsequently, the CCF will coordinate call signaling between the access signaling leg and the remote signaling leg for the call.

When the user element is originating a call, the CCF appears as a service provided by an application server. In one embodiment, the CCF is invoked as the first service in a chain of services. When the user element is terminating a call, the CCF is invoked as the last service in a chain of services. By locating the CCF with respect to the other services in this manner, other applications associated with the call are anchored by the CCF as part of the remote signaling leg of the call, and are therefore not impacted by transfers affecting the access signaling leg.

Upon detecting conditions requiring a transfer, the user element will establish an access signaling leg with the CCF using the CS or MS based address for the CCF. The access signaling leg is established via the "transferring-in" subsystem to request a transfer to the transferring-in subsystem. The CCF will execute a subsystem transfer procedure by replacing the access signaling leg currently communicating with the remote signaling leg with the access signaling leg established via the transferring-in subsystem. The CCF will subsequently release the access signaling leg that was established through the "transferring-out" subsystem.

The switch of the access signaling legs from the transferring-out subsystem to the transferring-in subsystem does not impact the remote signaling leg or the application services in the remote signaling leg. Through the access signaling leg in the transferring-in subsystem and the remote signaling leg, the appropriate bearer path may be established to the user element via the appropriate CS client or MS client. Since all call signaling is provided through the CCF, additional services may be associated with the call through any number of transfers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
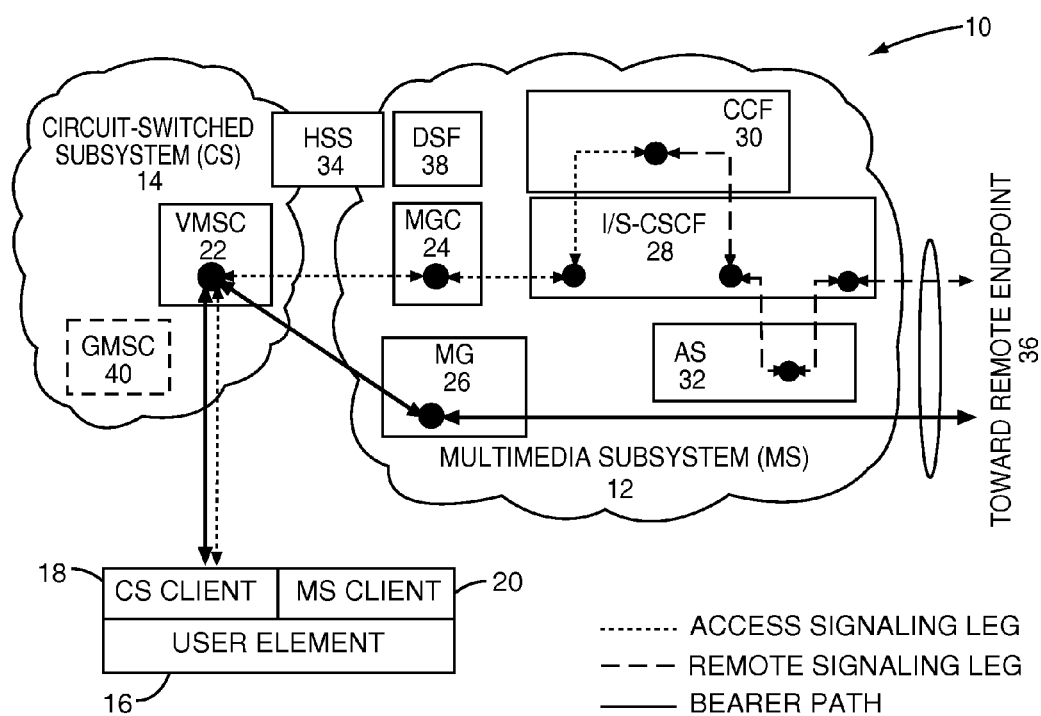
FIG. 1 is a communication environment illustrating circuit-switched subsystem access for a user element according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is employed in a communication environment where service control, including call control, for a user element is moved from a cellular network to a multimedia subsystem (MS), such as an Internet Protocol (IP) Multimedia Subsystem (IMS). As such, call control is provided by the MS regardless of whether the user element is using cellular or WLAN access for the call. For clarity and conciseness, a cellular network providing circuit-switched communications is referred to as a circuit-switched subsystem (CS), and a WLAN providing packet communications is assumed to be part of or associated with the MS. In general, wireless communication techniques having relatively limited range, such as WLAN techniques, are referred to as local wireless communication techniques. Local wireless communication techniques support packet-based communications, wherein cellular communication techniques will generally support circuit-switched communications. Further, the wireless access for local wireless techniques are of a limited range with respect to cellular access techniques.

The present invention employs a Domain Selection Function (DSF) in the MS to determine how to route incoming calls intended for the user element. The DSF is invoked when incoming calls intended for the user element are received in the MS for processing. Based on available domain selection criteria, the DSF will instruct appropriate call routing entities to route the incoming call to the user element via the MS or CS domains. The domain selection criteria may take various forms. For example, the DSF may select the MS or CS domains for routing the incoming call to the user element based on registration and communication capability via the MS, registration and communication capability via the CS, the (MS or CS) domain used for prior or existing calls, service provider preferences, and user preferences. The term "call" is used for purposes of illustration and is intended to cover all types of communication sessions used for the communication of voice, data, text, audio, and video information. Prior to delving into the details of the present invention, an overview is provided for an exemplary communication environment in which the present invention may be employed.

In this communication embodiment, call control for originating and terminating calls in the CS or MS as well as transferring calls between the CS and MS may be anchored at a continuity control function (CCF) in the MS. When call control is anchored in the CCF, all call signaling for the call is passed through the CCF. The CCF is a service generally provided in the user element's home MS and anchors the user element's active CS calls and MS sessions to enable mobility across the CS and MS while maintaining CS calls or MS sessions.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. In one embodiment, the CCF employs Third Party Call Control function to provide call control in the CS. For MS calls, the CCF provides call control by interacting with the user element and a remote endpoint to establish a bearer path directly between the user element and the remote endpoint through the MS. The CCF is addressable using public service identities (PSI). In the CS, a directory number associated with the CCF is used for routing call signaling messages within the CS. In the MS, a uniform resource location (URL) associated with the CCF is used for routing call signaling messages within the MS.

In the following description, 3GPP TS 24.008 (DTAP) is used in the CS while the Session Initiation Protocol (SIP) is used in the MS to effect origination, termination, and transfer of calls. Those skilled in the art will recognize other applicable and useful protocols as substitutes for DTAP and SIP. Further, the concepts of the present invention are not limited to IMS, and may be applied to any other MS.

Turning now to FIG. 1, a communication environment 10 is illustrated as having a home MS 12 and a visited CS 14 to support communications for a user element 16. The user element 16 includes a CS client 18 and an MS client 20, which are configured to support circuit-switched communications via the CS 14 as well as packet communications via the MS 12. For communications within the CS 14, a visited mobile switching center (VMSC) 22 will support circuit-switched communications for the user element 16. The VMSC 22 may interact with the MS 12 via a media gateway controller (MGC) 24 and an associated media gateway (MG) 26, both of which are affiliated with the MS 12.

The MS 12 may include various functions or entities, including an interrogating and serving call/session control function (I/S-CSCF) 28, a CCF 30, one or more application servers (AS) 32, and a home subscriber service (HSS) 34. Notably, the interrogating CSCF provides the standard I-CSCF functions and the serving CSCF provides standard S-CSCF functions. These functions are represented in the I/S-CSCF 28 for conciseness. Further, the HSS 34 may have a presence in both the CS 14 and the MS 12. The HSS 34 may include a home location resource component for home CS. Call/session control functions (CSCFs) in the home MS 12 generally act as SIP proxies and provide various functions in association with call control, as will be appreciated by those skilled in the art. In operation, an interrogating CSCF (I-CSCF) may interact with the HSS 34 to identify the serving CSCF (S-CSCF), which will be assigned to support a given user element 16. The HSS 34 may maintain an association between a user element 16 and a particular CCF 30 that is assigned to the user element 16. As such, the HSS 34 may assist in identifying a serving CSCF for the user element 16, as well as keep an association between a particular CCF 30 and the user element 16. The CCF PSI for the user element 16 may be provisioned in the user element 16 to enable the user element 16 to initiate transfers and the like controlled by the CCF 30. Alternatively, the CCF PSI may be transferred to the user element upon network registration.

Depending on whether the user element 16 is registered in the MS 12, different techniques may be used to access the MS 12. When the user element 16 is registered in the MS network, the user element 16 will have an S-CSCF assigned to it, and will use that S-CSCF to access the CCF 30. When the user element 16 is not registered in the MS network 12, a temporary S-CSCF may be assigned to the user element 16, and the temporary S-CSCF will be used to access the CCF 30.

The application servers 32 may be invoked and placed within the call signaling path to implement any number of features or services. When a particular application service provided by an application server 32 is invoked, all signaling for the associated call or session is passed through the application server 32, which has the opportunity to process call signaling messages as necessary to implement the desired service. Notably, the CCF 30 acts like a service, and as such, the I/S-CSCF 28 will operate to pass all call signaling messages for the call through the CCF 30, thereby allowing the CCF 30 to act as an anchor for the call.

In FIG. 1, the user element 16 is engaged in a call supported by the CS client 18 and controlled by the CCF 30. As such, call signaling for the call passes through the VMSC 22, media gateway controller 24, I/S-CSCF 28, CCF 30, and perhaps application server 32, if a service is invoked, on its way toward a remote endpoint 36. Notably, the access signaling leg, which is provided by the CS 14, is anchored at the CCF 30 and extends through the I/S-CSCF 28, media gateway controller 24, the VMSC 22, and CS client 18 of the user element 16. The remote signaling leg toward the remote endpoint 36 is anchored in the CCF 30 and extends through the I/S-CSCF 28 and the application server 32. In this configuration, the CCF 30 can maintain control of the call and provide any necessary call processing during the call. Further, if a call transfer is required, the CCF 30 maintains the remote signaling leg and establishes a new access signaling leg.

The bearer path for the call illustrated in FIG. 1 extends from the CS client 18 through the VMSC 22 and media gateway 26 on its way toward the remote endpoint 36. Notably, the media gateway controller 24 cooperates with the media gateway 26, such that a circuit-switched connection may be established between the media gateway 26 and the CS client 18 via the VMSC 22. The packet session may be established for the call from the media gateway 26 through the home MS 12 toward the remote endpoint 36.

Figure 2:
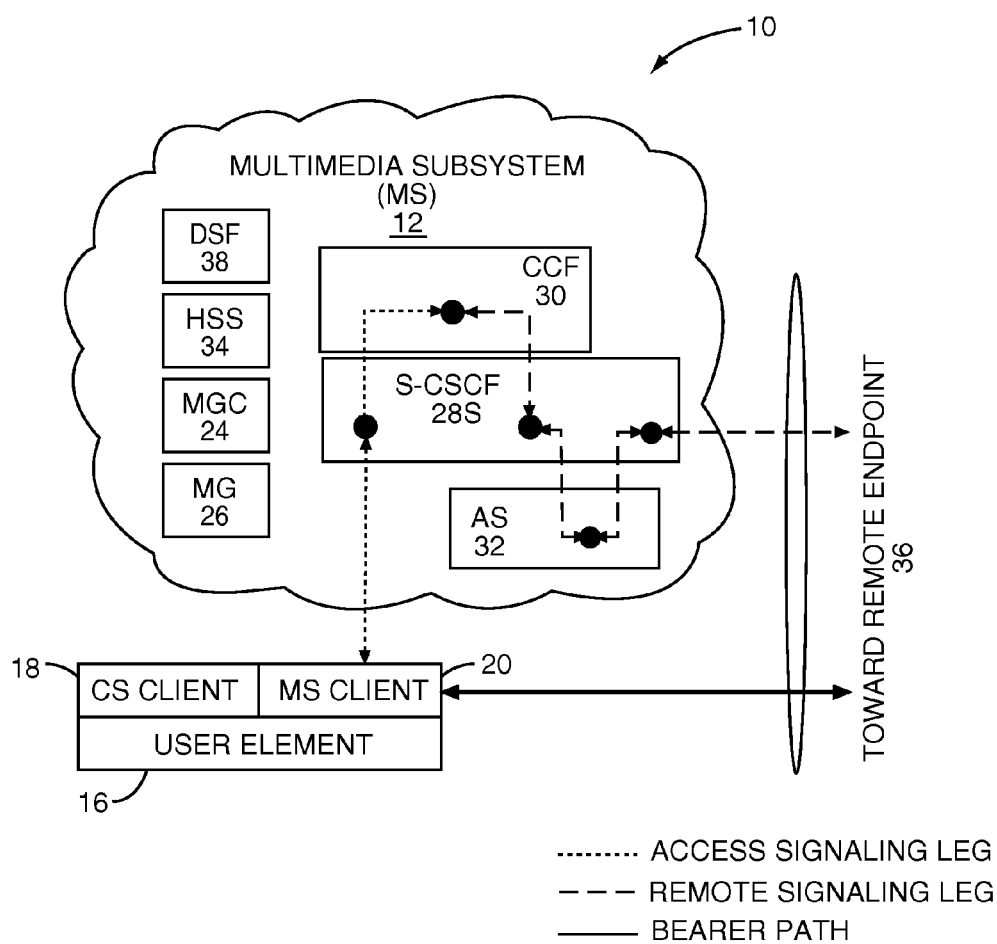
FIG. 2 is a communication environment illustrating multimedia subsystem access for a user element according to one embodiment of the present invention.

With reference to FIG. 2, a call supported by the MS client 20 of the user element 16 is represented. Notably, the call does not extend through the CS 14, and will not employ the services of the VMSC 22, media gateway controller 24, or media gateway 26. Instead, the MS client 20 will support call signaling directly with the MS 12, and in particular with the CCF 30 via an S-CSCF 28S. Notably, the I/S-CSCF 28 and the S-CSCF 28S may represent the same CSCF or different CSCFs, depending on how the user element 16 registers with the MS 12.

As illustrated, call signaling is anchored in the CCF 30, wherein an access signaling leg is provided between the CCF 30 and the MS client 20 via the S-CSCF 28S. A remote signaling leg is supported between the remote endpoint 36 and the CCF 30 via the S-CSCF 28S and any desired application servers 32 that may provide additional services in association with the call. The bearer path will extend from the MS client 20 toward the remote endpoint 36 via the MS 12, without traveling through the CS 14 (FIG. 1). Again, the CCF 30 anchors the call, such that if a transfer is required, the remote signaling leg toward the remote endpoint 36 can be maintained, while the access signaling leg may be changed to facilitate the transfer from the home MS 12 to the CS 14, as will be described further below. For transfer of calls between the CS 14 and the MS 12, the access signaling legs illustrated in FIGS. 1 and 2 will be changed to support the transfer, while the remote signaling leg is maintained by the CCF 30.

Subsystem transfers enable the user element 16 to move between the CS 14 and the MS 12 while maintaining one or more active calls (voice sessions). Call transfers associated with a given call, including initial and subsequent transfers, are executed and controlled in the home MS 12 by the CCF 30, upon a request received from the user element 16. To enable such transfers, the CCF 30 is inserted into the signaling path of the calls by an S-CSCF 28S. To anchor the signaling path, the CCF 30 will employ a back-to-back user agent function (B2BUA), which may operate as follows. When the user element 16 originates a call, the CCF 30 will terminate an access signaling leg from the user element 16 and establish a remote signaling leg toward the remote endpoint 36. When terminating a call at the user element 16, the CCF 30 will terminate a remote signaling leg from the remote endpoint 36 and establish an access signaling leg toward the user element 16. Subsequently, the CCF 30 will coordinate call signaling between the access signaling leg and the remote signaling leg for the call.

When the user element 16 is originating a call, the CCF 30 appears as a service provided by an application server, such as the application server 32. In one embodiment, the CCF 30 is invoked as the first service in a chain of services. When the user element 16 is terminating a call, the CCF 30 is invoked as the last service in a chain of services. By locating the CCF 30 with respect to the other services in this manner, other applications associated with the call are anchored by the CCF 30 as part of the remote signaling leg of the call, and are therefore not impacted by transfers affecting the access signaling leg.

Upon detecting conditions requiring a transfer, the user element 16 will establish an access signaling leg with the CCF 30 using the CS or MS based address for the CCF 30. The access signaling leg is established via the "transferring-in" subsystem to request a transfer to the transferring-in subsystem. The CCF 30 will execute a subsystem transfer procedure by replacing the access signaling leg currently communicating to the remote signaling leg with the access signaling leg established via the transferring-in subsystem. The CCF 30 will subsequently release the access signaling leg that was established through the "transferring-out" subsystem. The switch of the access signaling legs from the transferring-out subsystem to the transferring-in subsystem does not impact the remote signaling leg or the application services in the remote signaling leg. Through the access signaling leg in the transferring-in subsystem and the remote signaling leg, the appropriate bearer path may be established to the user element 16 via the appropriate CS client 18 or MS client 20. Since all call signaling is provided through the CCF 30, additional services may be associated with the call through any number of transfers. Further details are provided in association with the following communication flows.

In one embodiment of the present invention, a Mobile Station Integrated Services Digital Network (MSISDN) or other user element identifier is owned and controlled by the MS 12 to enable anchoring of incoming calls intended for the user element 16 at the CCF 30. Incoming calls destined for the user element 16 and originated from the CS 14, the public switched telephone network (PSTN), or other MS can be anchored at the CCF 30 by setting up routing functions at the originating service nodes, such that incoming calls intended for the user element 16 are delivered to the home MS 12. As such, the CCF 30 can take the necessary steps to find the user element 16 and route the call to the user element 16, even if the user element 16 is in the CS 14 when the call arrives.

As indicated, the HSS 34 may store filter criteria associated with the CCF 30 as part of the user element's subscription profile. The CCF filter criteria is downloaded to the currently assigned S-CSCF 28S as part of the initial filter criteria to use when the user element 16 registers with the MS 12. This filter criteria is generally executed at the S-CSCF 28S upon initiation of a call or session from the user element 16 or upon receipt of an incoming session intended for the user element 16. The filter criteria will instruct the S-CSCF 28S to invoke the CCF 30 to control at least the bearer path for the call or session.

A DSF 38 is provided in the MS 12 to determine whether to route incoming calls to the user element 16 via the MS 12 or CS 14. The DSF 38 may be provided in a standalone service node, as illustrated, or integrated with another call signaling entity, such as the HSS 34. The DSF 38 operates in close association with the S-CSCF 28S and the HSS 34. Regardless of origination from the MS 12, CS 14, or other domain, all incoming calls intended for the user element 16 are routed to the S-CSCF 28S in the MS 12. The S-CSCF 28S directly or indirectly employs the DSF 38 to determine whether to use the MS 12 or the CS 14 for the incoming call. Based on available domain selection criteria, the DSF 38 will select an appropriate domain (MS 12 or CS 14) to use for routing the incoming call to the user element 16. The domain decision of the DSF 38 is provided to the S-SCSF 28S, which will proceed by routing the incoming call to the selected domain.

When the user element 16 is only supported by one domain, the domain selected is the available domain. When the user element 16 is supported by both the MS 12 and the CS 14, the domain selected may be based on various domain selection criteria. The domain selection criteria may be established to fulfill the routing needs and desires of the service providers, users, or both. For example, the domain selection criteria may include any one or a combination of the following: registration in the MS 12, communication capability via the MS 12, registration in the CS 14, communication capability via the CS 14, the (MS 12 or CS 14) domain used for prior or existing calls, service provider preferences, user preferences, the capabilities of the MS client 20 and the CS client 18, and the type of session being established. The present invention is particularly beneficial when the user element 16 is registered in and capable of communicating via both the MS 12 and the CS 14. In this case, calls may be routed in either domain, and the DSF 38 will use the domain selection criteria to select the most appropriate of the available domains.

In the following communication flows, two primary embodiments are used for providing the DSF 38. For the communication flows of FIGS. 3 through 7, the DSF 38 is separate from the HSS 34. Upon receiving an incoming call intended for the user element 16, the S-CSCF 28S is configured to send a domain selection query to the DSF 38. The DSF 38 may interact with the HSS 34 to obtain domain selection criteria to aid in selecting the appropriate domain and provide a domain selection response to the S-CSCF 28S, which will route the incoming call to the user element 16 via the selected domain. For the communication flows of FIGS. 8 through 11, the DSF 38 is integrated into the HSS 34. Upon receiving an incoming call intended for the user element 16, the S-CSCF 28S is configured to send a domain selection query to the HSS 34, which will invoke the DSF 38. The DSF 38 will identify domain selection criteria, which may be stored in the HSS 34, to aid in selecting the appropriate domain. The HSS 34 will provide a domain selection response to the S-CSCF 28S, which will route the incoming call to the user element 16 via the selected domain. Further, certain of the scenarios invoke the use of a gateway mobile switching center 40, which acts as an entry point into the CS 14 from other domains.

For all of the communication flows, abbreviated signaling is provided to maintain conciseness and clarity. The abbreviated signaling is provided to illustrate the signaling and bearer paths, domain selection, and call routing for numerous examples. Those skilled in the art will recognize the associated signaling necessary for operation in light of the abbreviated signaling provided herein. Communications between the S-CSCF 28S and the DSF 38 or HSS 34 may use a new Diameter-based interface that is similar to the Diameter-based Cx interface employed in IMS.

Figure 3:
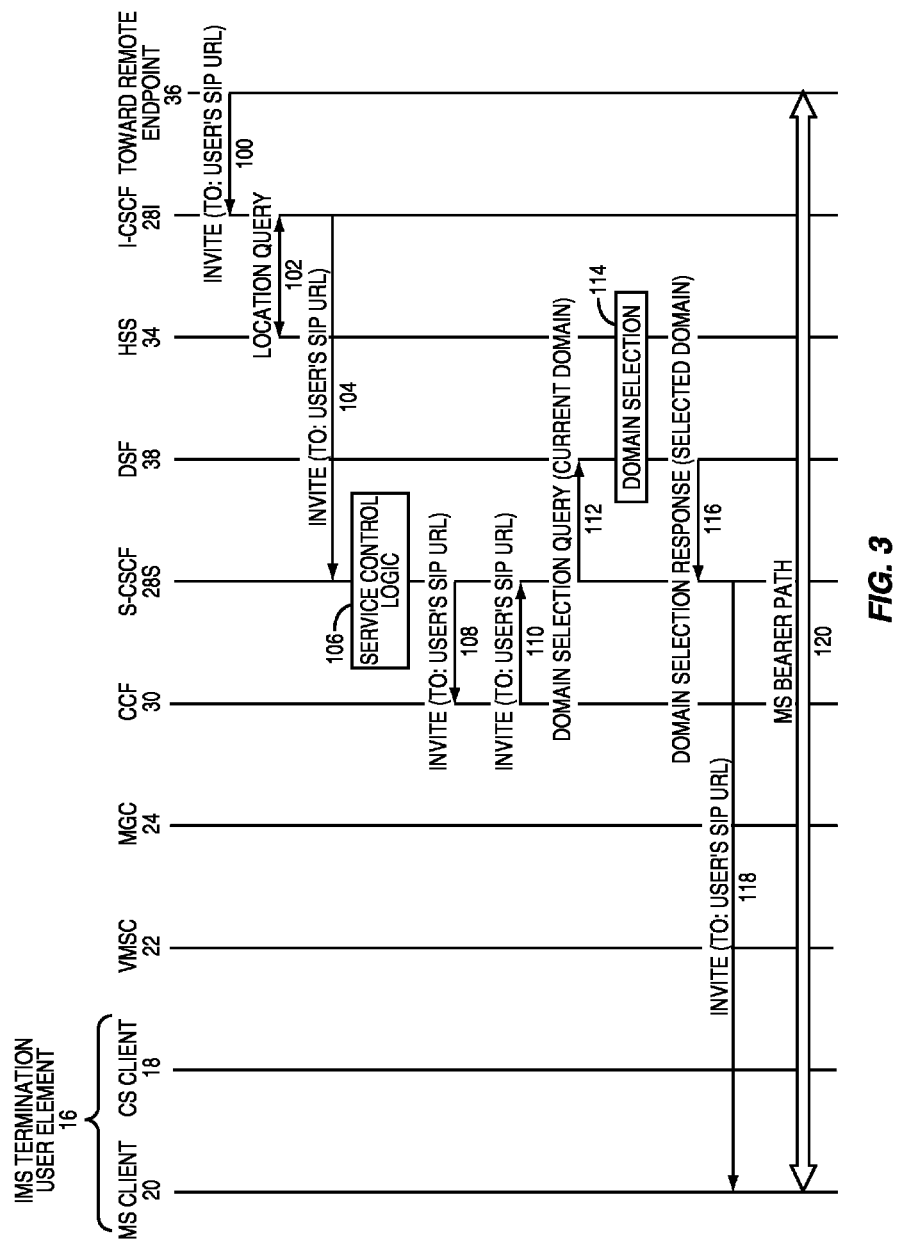
FIG. 3 shows a communication flow illustrating receiving an incoming call via the multimedia subsystem according to one embodiment of the present invention.

Turning now to FIG. 3, a communication flow is provided wherein an incoming call is terminated at the MS client 20 of the user element 16 via the MS 12. Initially, an Invite message originated from the remote endpoint 36 is passed to the I-CSCF 281 in the MS 12 (step 100). The Invite message identifies the SIP URL associated with the user of the user element 16 as the intended destination for a call. If the incoming call was originated from the CS 14, the call would have been routed through the media gateway controller 24 to the I-CSCF 281. The I-CSCF 281 may invoke a location query to the HSS 34 to identify the S-CSCF 28S with which the user is registered (step 102). If the user is not registered, the HSS 34 will assign the S-CSCF 28S for the unregistered user. Once the S-CSCF 28S is identified, the Invite message is sent to the S-CSCF 28S for processing according to IMS processing procedures defined in 3GPP TS 23.228 (step 104). The S-CSCF 28S will validate the service profile associated with the user, and execute any termination service control logic for the user (step 106). In this example, the termination service control logic requires invocation of the CCF 30 as a call anchor point. Accordingly, the S-CSCF 28S will forward the Invite message to the CCF 30, which invokes a back-to-back user agent or like function to anchor call signaling for the call (step 108). The CCF 30 will then forward the Invite message back to the S-CSCF 28S (step 110).

In this embodiment of the present invention, the S-CSCF 28S will send a Domain Selection Query to the DSF 38 to identify the domain through which the incoming call should be routed to the user element 16 (step 112). If the user element 16 is currently engaged in an active call, the domain supporting the active call is known by the S-CSCF 28S, and is passed to the DSF 38 in the Domain Selection Query as the "current domain." The current domain information may be used as domain selection criteria by the DSF 38 to select a domain through which the incoming call should be routed to the user element 16 in cooperation with the HSS 34 (step 114). As such, additional domain selection criteria may be retrieved from the HSS 34 by the DSF 38 for domain selection. Once a domain is selected, the DSF 38 will provide the selected domain to the S-CSCF 28S in a Domain Selection Response (step 116). In this example, the current domain is the selected domain, which corresponds to the MS 12.

Since the S-CSCF 28S is instructed by the DSF 38 to route the call via the MS 12, the S-CSCF 28S will forward an Invite message toward the user element 16 via the MS 12. The Invite message is received via the MS client 20 of the user element 16 (step 118). After exchange of the requisite SIP messaging for the call, an MS bearer path is established between the MS client 20 of the user element 16 and the remote endpoint 36 (step 120).

Figure 4:
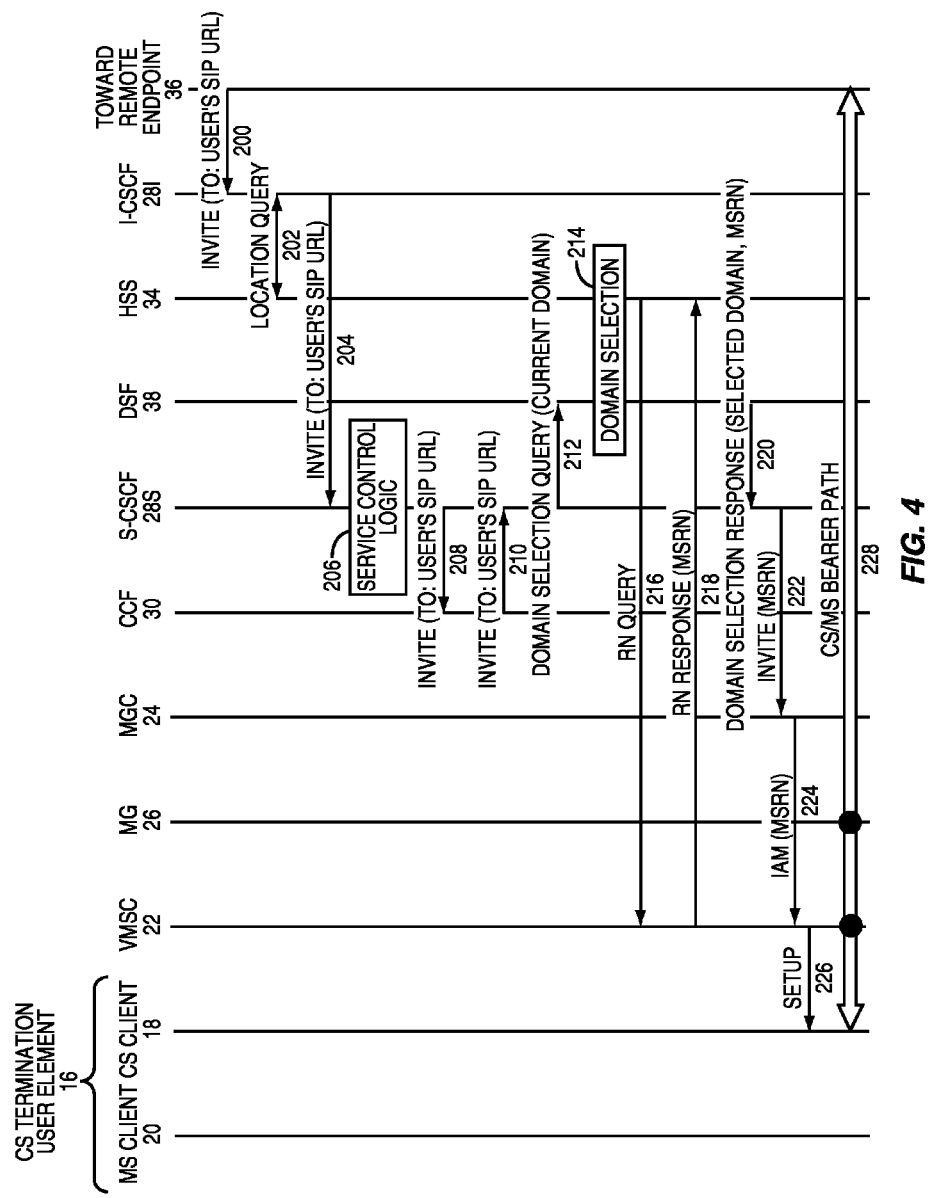
FIG. 4 shows a communication flow illustrating receiving an incoming call via the circuit-switched subsystem according to one embodiment of the present invention.

Turning now to FIG. 4, a communication flow is provided wherein an incoming call is terminated at the CS client 18 of the user element 16 via the CS 14. Initially, an Invite message originated from the remote endpoint 36 is passed to the I-CSCF 281 in the MS 12 (step 200). The Invite message identifies the SIP URL associated with the user of the user element 16 as the intended destination for a call. If the incoming call was originated from the CS 14, the call would have been routed through the media gateway controller 24 to the I-CSCF 281. The I-CSCF 281 may invoke a location query to the HSS 34 to identify the S-CSCF 28S with which the user is registered (step 202). If the user is not registered, the HSS 34 will assign the S-CSCF 28S for the unregistered user. Once the S-CSCF 28S is identified, the Invite message is sent to the S-CSCF 28S for processing according to IMS processing procedures defined in 3GPP TS 23.228 (step 204). The S-CSCF 28S will validate the service profile associated with the user, and execute any termination service control logic for the user (step 206). Again, the termination service control logic requires invocation of the CCF 30 as a call anchor point. Accordingly, the S-CSCF 28S will forward the Invite message to the CCF 30, which invokes a back-to-back user agent or like function to anchor call signaling for the call (step 208). The CCF 30 will then forward the Invite message back to the S-CSCF 28S (step 210).

Again In this embodiment, the S-CSCF 28S will send a Domain Selection Query to the DSF 38 to identify the domain through which the incoming call should be routed to the user element 16 (step 212). If the current domain information is available, the S-CSCF 28S will pass the current domain information in the Domain Selection Query to the DSF 38, which will interact with the HSS 34 to selection an appropriate domain. In this example, assume the current domain is the CS 14 and the DSF 38 selects the CS 14 for the incoming call (step 214). Since the CS 14 is selected, a routing number is needed to route the call to the VMSC 22, which is supporting the CS client 18 of the user element 16. The routing number in this example is a mobile subscriber routing number (MSRN), which may be a temporary number assigned to the CS client 18 of the user element 16 by the VMSC 22. To obtain the routing number, the HSS 34 may send a Routing Number (RN) Query to the VMSC 22 (step 216), which will respond by providing an MSRN for the CS client 18 of the user element 16 to the HSS 34 in an RN Response (step 218).

The HSS 34 will provide the MSRN to the DSF 38, which will provide the selected domain and the MSRN for routing the call to the S-CSCF 28S in a Domain Selection Response (step 220). The S-CSCF 28S will then send an Invite message toward the media gateway controller 24, which is associated with the VMSC 22 (step 222). The Invite message will include the MSRN for the CS client 18 of the user element 16. The media gateway controller 24 will then provide an Integrated Services User Part (ISUP) Initial Address Message (IAM) using the MSRN to the VMSC 22 (step 224), which will provide an appropriate Setup message to the CS client 18 of the user element 16 to present the incoming call (step 226). The requisite signaling is exchanged, and a CS/MS bearer path is exchanged between the CS client 18 of the user element 16 and the remote endpoint 36 via the VMSC 22 and the media gateway 26 associated with the media gateway controller 24 (step 228).

From the above, the S-CSCF 28S will invoke the DSF 38 to select a domain to use for routing incoming calls to either the MS client 20 or the CS client 18 of the user element 16, depending on available domain selection criteria provided by the S-CSCF 28S, known by the DSF 38, or retrieved from other entities, such as the HSS 34. In these examples, the domain selection criteria included the current domain, which identifies the domain through which existing calls with the user element 16 are supported. In one embodiment, the S-CSCF 28S may keep track of the domain used for routing incoming calls to the user element 16. Thus, for the communication flows of FIGS. 3 and 4, the S-CSCF 28S will keep track of the selected domain for active calls.

Figure 5:
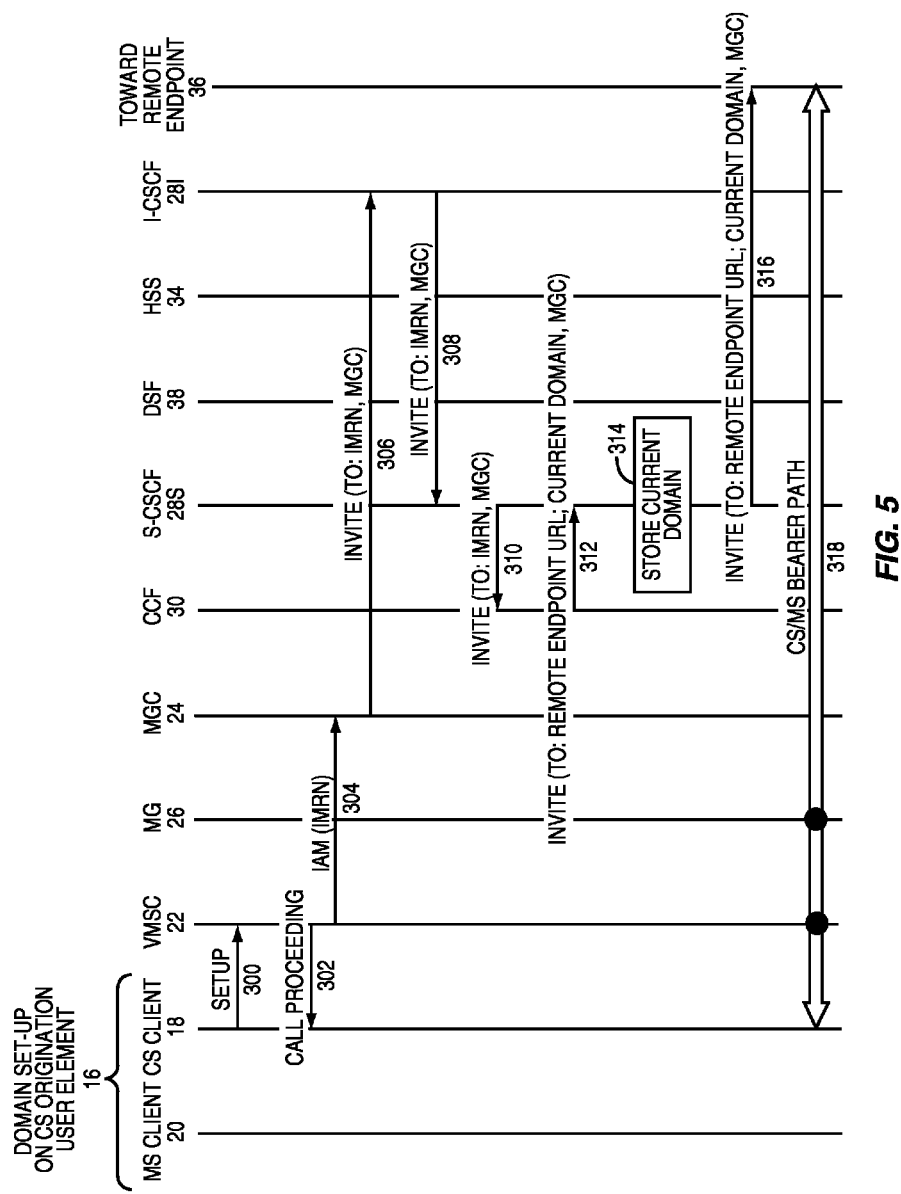
FIG. 5 shows a communication flow illustrating originating a call via the circuit-switched subsystem according to one embodiment of the present invention.

With reference to FIG. 5, a communication flow is illustrated for initiating a call from the user element 16, and in particular from the CS client 18 of the user element 16. During this initiation process, the S-CSCF 28S will keep track of the current domain. To initiate a call, the CS client 18 of the user element 16 may send a Setup message to the VMSC 22 (step 300), which will respond by sending a Call Proceeding message back to the CS client 18 of the user element 16 (step 302), as well as by sending an IAM to the media gateway controller 24 (step 304). The IAM may include an IP Multimedia Routing Number (IMRN) associated with the remote endpoint 36. The media gateway controller 24 will respond by sending an Invite message toward the I-CSCF 28I including the IMRN and identifying information for the media gateway controller 24, which will represent the user element 16 in the MS 12 (step 306). The I-CSCF 28I will forward the Invite message to the S-CSCF 28S (step 308), which will send it to the CCF 30, directly or indirectly via another CSCF (step 310). The CCF 30 will identify the current domain (CS 14) and forward the Invite message to the S-CSCF 28S (step 312). The CCF 30 may include the current domain information in the Invite message, such that the S-CSCF 28S can identify the current domain and store information identifying the current domain for subsequent use (step 314).

For the present invention, the current domain information may be passed to the DSF 38 in association with processing incoming calls to assist in selecting a domain to use for routing the incoming calls to the user element 16. Continuing with the call origination scenario, the S-CSCF 28S may forward the Invite message toward the remote endpoint 36 (step 316), wherein after the appropriate call signaling is exchanged along the call signaling path outlined above, a CS/MS bearer path is established between the CS client 18 of the user element 16 and the remote endpoint 36 via the VMSC 22 and the media gateway 26 associated with the media gateway controller 24 (step 318).

Figure 6:
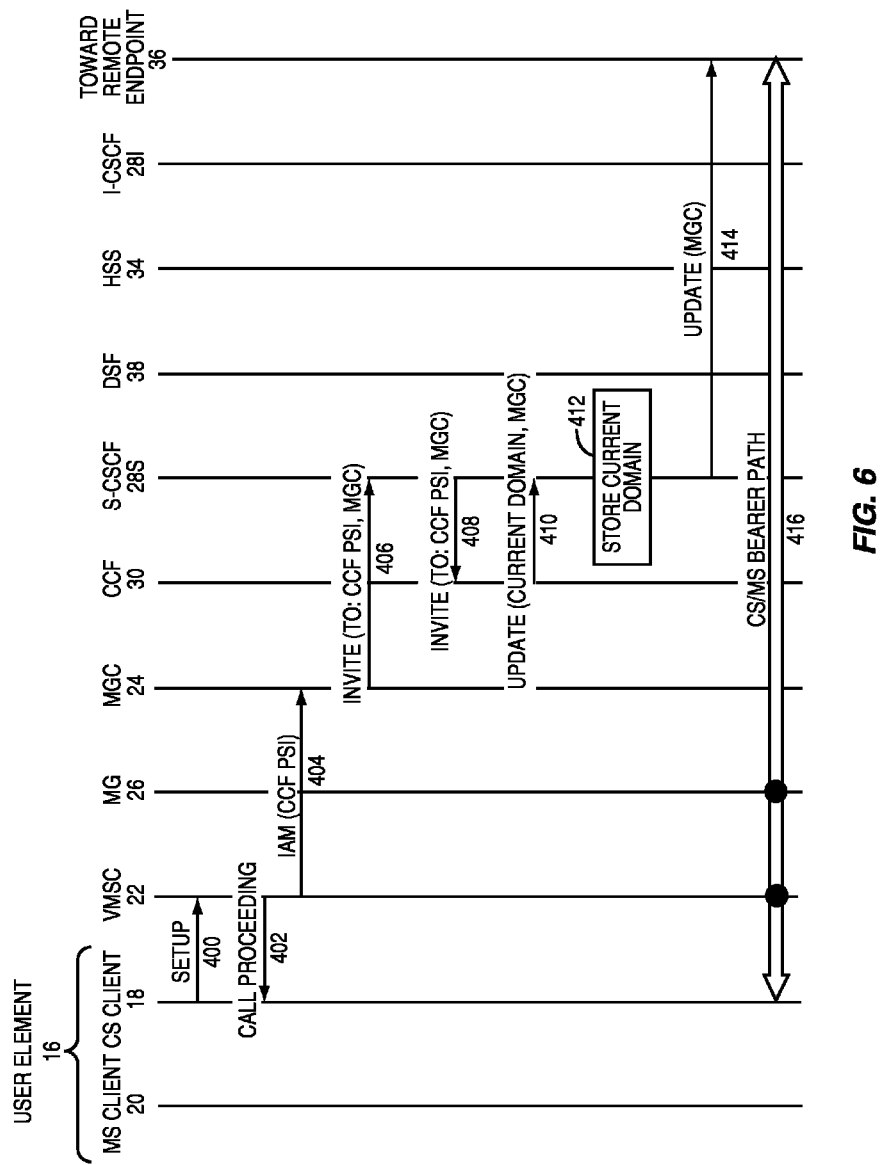
FIG. 6 shows a communication flow illustrating the transfer of the call established in FIG. 3 to the circuit switched subsystem according to one embodiment of the present invention.

Turning now to FIG. 6, a scenario is illustrated where a call established via the MS client 20 of the user element 16 through the MS 12 is transferred to the CS client 18 through the CS 14. Assume the call through the MS 12 via the MS client 20 of the user element 16 is already established. To initiate a transfer, the CS client 18 of the user element 16 may send a Setup message to the VMSC 22 to initiate a transfer of the call from the MS client 20 to the CS client 18 (step 400). Notably, the intended destination for the Setup message is the CCF 30, which is currently anchoring the call. In this embodiment, the Setup message is directed to the CCF PSI. Upon receipt of the Setup message, the VMSC 22 will send a Call Proceeding message back to the CS client 18 of the user element 16 (step 402), as well as send an IAM to the media gateway controller 24 (step 404). The IAM will include the CCF PSI, and the media gateway controller 24 will initiate an Invite message to the S-CSCF 28S including the CCF PSI and identifying the media gateway controller 24 as the representative of the user element 16 in the MS 12 for the call (step 406).

The S-CSCF 28S will forward the Invite message to the CCF 30 (step 408), which will determine that the current domain will be the CS 14 and send an update for the remote endpoint 36 to effect a transfer. Notably, the Update message will include the Session Data Protocol (SDP) information for the media gateway controller 24 as well as the current domain, once the transfer is effected. As such, when the Update message is sent to the S-CSCF 28S on its way toward the remote endpoint 36 (step 410), the S-CSCF 28S may store the current domain information for subsequent use, and in particular to assist in selecting a domain to use for incoming calls intended for the user element 16 (step 412). The S-CSCF 28S will then forward the Update message including the SDP information for the media gateway controller 24 toward the remote endpoint 36 (step 414). During this transfer process, the remote signaling leg remains intact between the CCF 30 and the remote endpoint 36, while a new access signaling leg is created between the CS client 18 of the user element 16 and the CCF 30. The resultant signaling exchange will result in a CS/MS bearer path being established for the call between the CS client 18 of the user element 16 and the remote endpoint 36 via the VMSC 22 and the media gateway 26 associated with the media gateway controller 24 (step 416).

Figure 7:
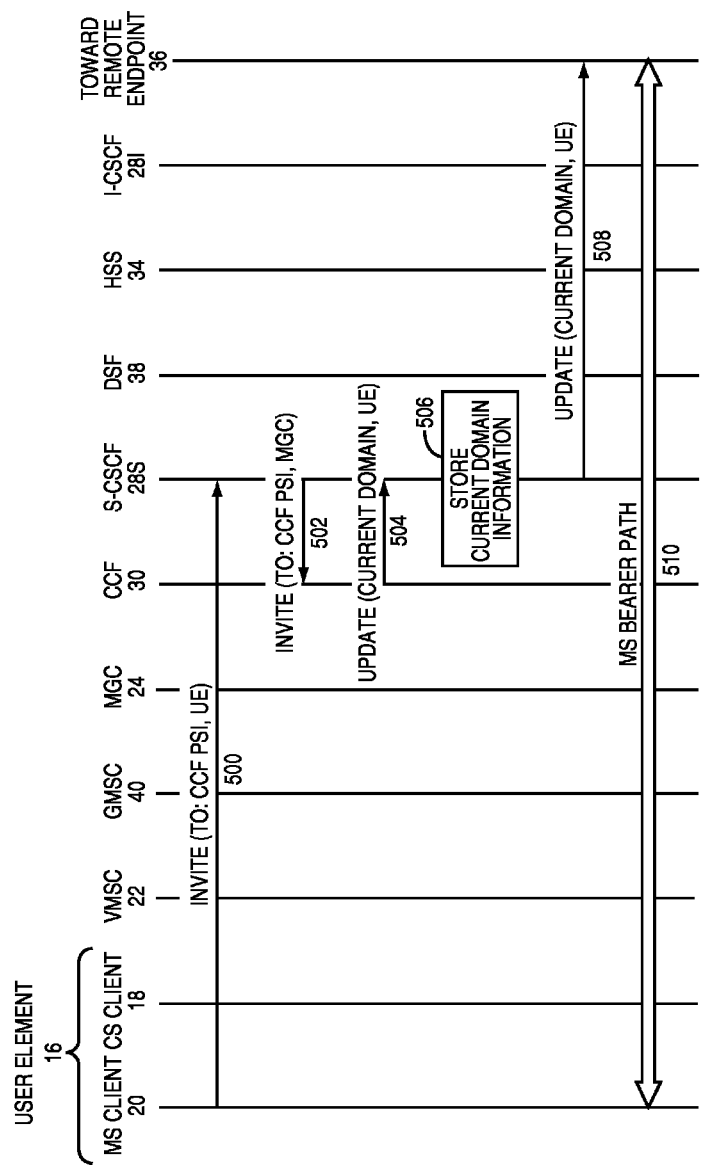
FIG. 7 shows a communication flow illustrating the transfer of the call of FIG. 4 back to the multimedia subsystem according to one embodiment of the present invention.

Turning now to FIG. 7, a communication flow is provided for transferring a call supported via the CS client 18 of the user element 16 to the MS client 20 of the user element 16. Assume the call is established with the CS client 18 as illustrated in FIG. 6, and a transfer is initiated to transfer the call back to the MS client 20 of the user element 16. As such, the MS client 20 of the user element 16 may send an Invite message toward the S-CSCF 28S to initiate the transfer (step 500). The Invite message is addressed to the CCF 30 using the CCF PSI, and will identify the MS client 20 of the user element 16 as an endpoint for communications. The S-CSCF 28S will pass the Invite message to the CCF 30 (step 502), which will recognize that a transfer is being requested and that the current domain after the transfer will be the MS 12. As such, the CCF 30 will send an Update message toward the remote endpoint 36 via the S-CSCF 28S (step 504). The Update message will identify the current domain after the transfer is effected, as well as the SDP information for the MS client 20 of the user element 16. When processing the Update message, the S-CSCF 28S will store the current domain information (step 506) and forward the Update message toward the remote endpoint 36 (step 508). The appropriate messaging will be exchanged between the user element 16 and the remote endpoint 36 via the signaling path, which traverses the CCF 30 to allow the MS bearer path to be established directly between the MS client 20 of the user element 16 and the remote endpoint 36 (step 510).

For additional information pertaining to transferring a call from one domain to another, attention is directed to commonly assigned U.S. patent application Ser. No. 11/378,776 entitled CIRCUIT-SWITCHED AND MULTIMEDIA SUBSYSTEM VOICE CONTINUITY and filed Mar. 17, 2006, the disclosure of which is incorporated herein by reference in its entirety.

For the remaining communication flows, the functionality of the DSF 38 is incorporated in the HSS 34. As such, the S-CSCF 28S will not directly communicate with the DSF 38 to determine how to route incoming calls. Instead, the S-CSCF 28S will access the HSS 34 directly.

Figure 8:
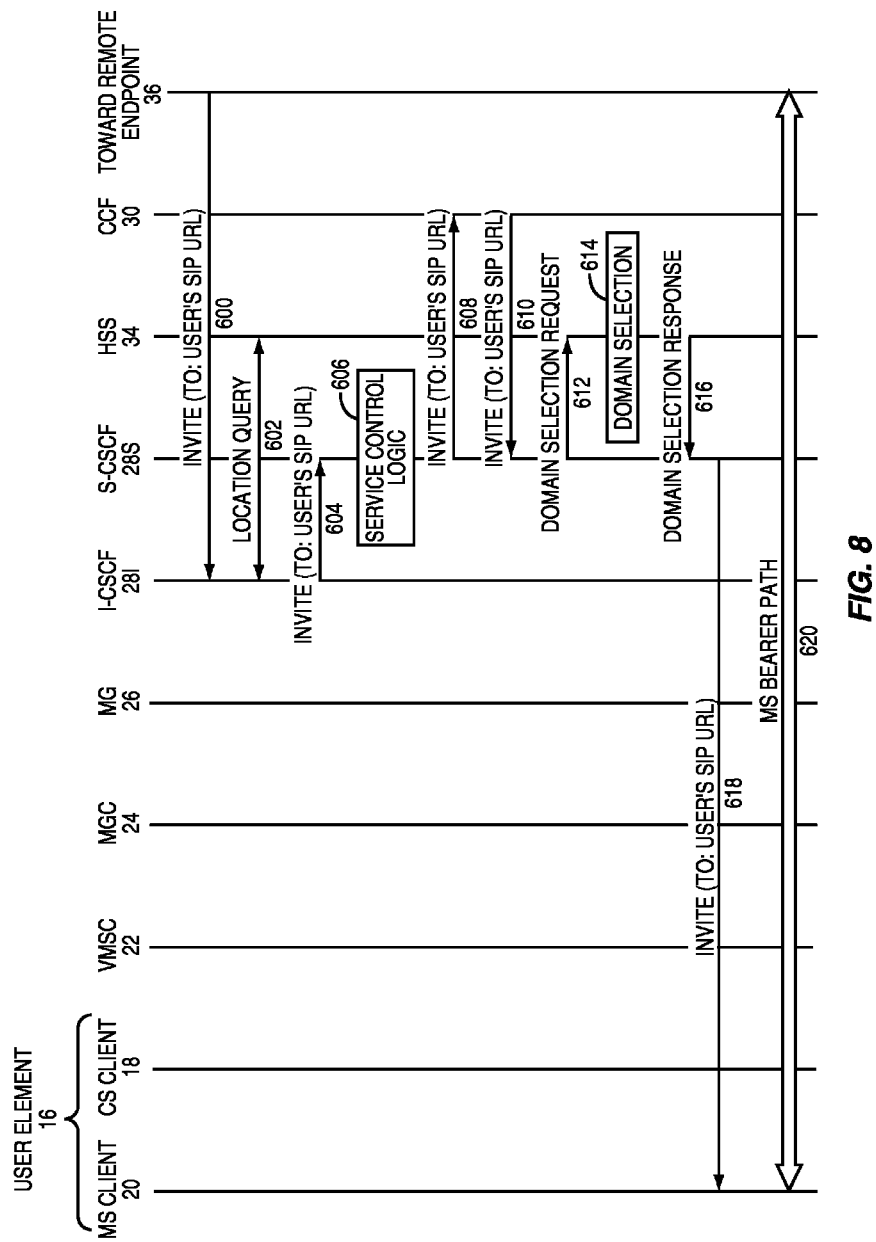
FIG. 8 shows a communication flow illustrating receiving an incoming call via the multimedia subsystem according to a second embodiment of the present invention.

Turning now to FIG. 8, a communication flow is provided wherein an incoming call is terminated at the MS client 20 of the user element 16 via the MS 12. Initially, an Invite message originated from the remote endpoint 36 is passed to the I-CSCF 281 in the MS 12 (step 600). The Invite message identifies the SIP URL associated with the user of the user element 16 as the intended destination for a call. If the incoming call was originated from the CS 14, the call would have been routed through the media gateway controller 24 to the I-CSCF 281. The I-CSCF 281 may invoke a location query to the HSS 34 to identify the S-CSCF 28S with which the user is registered (step 602). If the user is not registered, the HSS 34 will assign the S-CSCF 28S for the unregistered user. Once the S-CSCF 28S is identified, the Invite message is sent to the S-CSCF 28S for processing according to IMS processing procedures defined in 3GPP TS 23.228 (step 604). The S-CSCF 28S will validate the service profile associated with the user, and execute any termination service control logic for the user (step 606). In this example, the termination service control logic requires invocation of the CCF 30 as a call anchor point. Accordingly, the S-CSCF 28S will forward the Invite message to the CCF 30, which invokes a back-to-back user agent or like function to anchor call signaling for the call (step 608). The CCF 30 will then forward the Invite message back to the S-CSCF 28S (step 610).

At this point, the S-CSCF 28S will employ the HSS 34 to determine the domain to use for routing the incoming call to the user element 16. As such, the S-CSCF 28S may send a Domain Selection Request directly to the HSS 34 (step 612), which will make the domain selection based on the domain selection criteria (step 614) and provide the selected domain back to the S-CSCF 28S in a Domain Selection Response (step 616). The domain selection criteria used for selecting the domain may be based on the current domain, which is supporting an existing call or calls, or other information as outlined above. Once the S-CSCF 28S determines the domain to use for routing the incoming call to the user element 16, the call is routed accordingly. In this example, the selected domain is the MS 12, and as such, the S-CSCF 28S will send an Invite message to the MS client 20 of the user element 16 using the user's SIP URL (step 618). Once the requisite signaling is exchanged over the established signaling path, an MS bearer path is established between the MS client 20 of the user element 16 and the remote endpoint 36 (step 620).

Figure 9A:
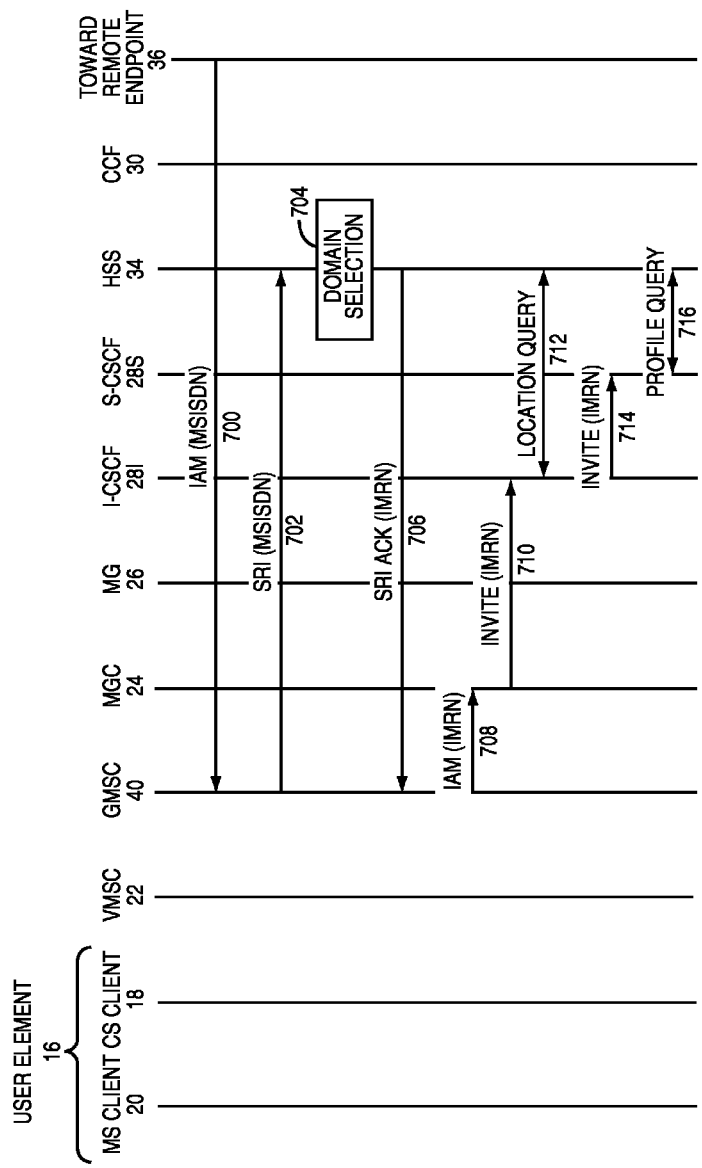
FIGS. 9A and 9B show a communication flow illustrating receiving an incoming call via the multimedia subsystem according to a third embodiment of the present invention.
Figure 9B:
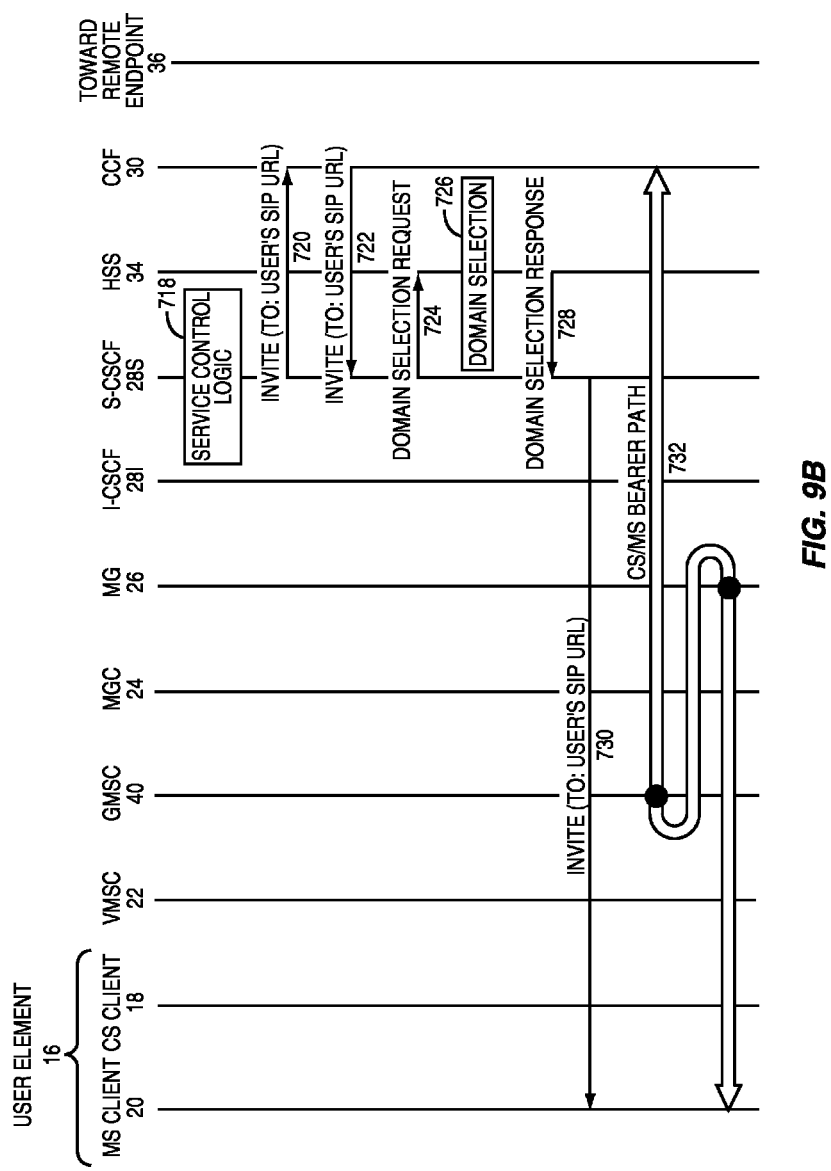

Turning now to FIGS. 9A and 9B, a communication flow is illustrated for terminating an incoming call via the MS 12, wherein the call is originated from the CS 14. In this example, service control is centralized in the CS 14 when the call is originally presented. The originating network supporting the remote endpoint 36 will send an IAM to the GMSC 40 in the CS 14 (step 700). The IAM will include the MSISDN for the user element 16. If the call was originated in another MS, the call would have been presented to the media gateway controller 24 as described above. The GMSC 40 will send a Send Routing Information (SRI) message including the MSISDN to the HSS 34 to obtain routing information (step 702). The HSS 34 will use the MSISDN to perform initial network domain selection (step 704). In this instance, the HSS 34 will determine that the call needs to be anchored at the CCF 30 in the MS 12. The HSS 34 will allocate an IMRN for the user element 16 and pass the IMRN back to the GMSC 40 in an SRI Acknowledgement (ACK) message (step 706).

Next, the GMSC 40 will initiate an IAM including the IMRN to the media gateway controller 24 (step 708). In response, the media gateway controller 24 will process the IAM and initiate an Invite message to the I-CSCF 281 (step 710). The destination in the Invite message will identify the IMRN. The I-CSCF 281 will perform a location query for the user element 16 using the HSS 34 (step 712). The HSS 34 will assign the S-CSCF 28S to the user element 16 and provide corresponding information back to the I-CSCF 281. The I-CSCF 281 will then send an Invite message to the S-CSCF 28S (step 714). Again, the Invite message will include the IMRN. The S-CSCF 28S will then provide a Profile Query to the HSS 34 to obtain the service profile associated with the user element 16 (step 716). The service profile will include the SIP URL for the user or the user element 16.

The S-CSCF 28S will validate the service profile associated with the user, and execute any termination service control logic for the user (step 718). In this example, the termination service control logic requires invocation of the CCF 30 as a call anchor point. Accordingly, the S-CSCF 28S will forward the Invite message to the CCF 30, which invokes a back-to-back user agent or like function to anchor call signaling for the call (step 720). The CCF 30 will then forward the Invite message back to the S-CSCF 28S (step 722).

At this point, the S-CSCF 28S will employ the HSS 34 to determine the domain to use for routing the incoming call to the user element 16. As such, the S-CSCF 28S may send a Domain Selection Request directly to the HSS 34 (step 724), which will make the domain selection based on the domain selection criteria (step 726) and provide the selected domain back to the S-CSCF 28S in a Domain Selection Response (step 728). Once the requisite signaling is exchanged over the established signaling path, a CS/MS bearer path is established between the MS client 20 of the user element 16 and the remote endpoint 36 via the GMSC 40 and the media gateway 26 associated with the media gateway controller 24 (step 730).

Figure 10A:
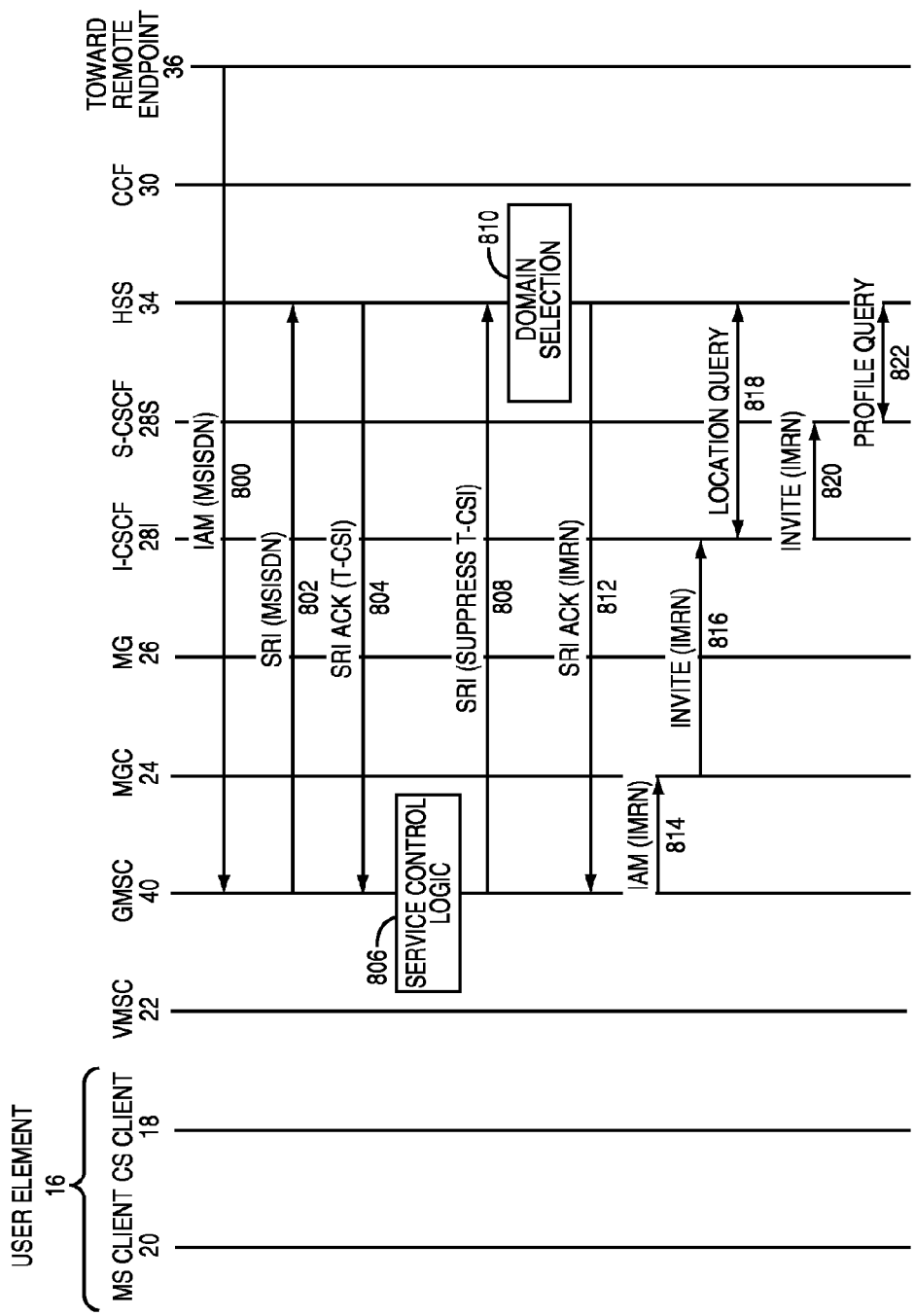
FIGS. 10A and 10B show a communication flow illustrating receiving an incoming call via the multimedia subsystem according to a third embodiment of the present invention.
Figure 10B:
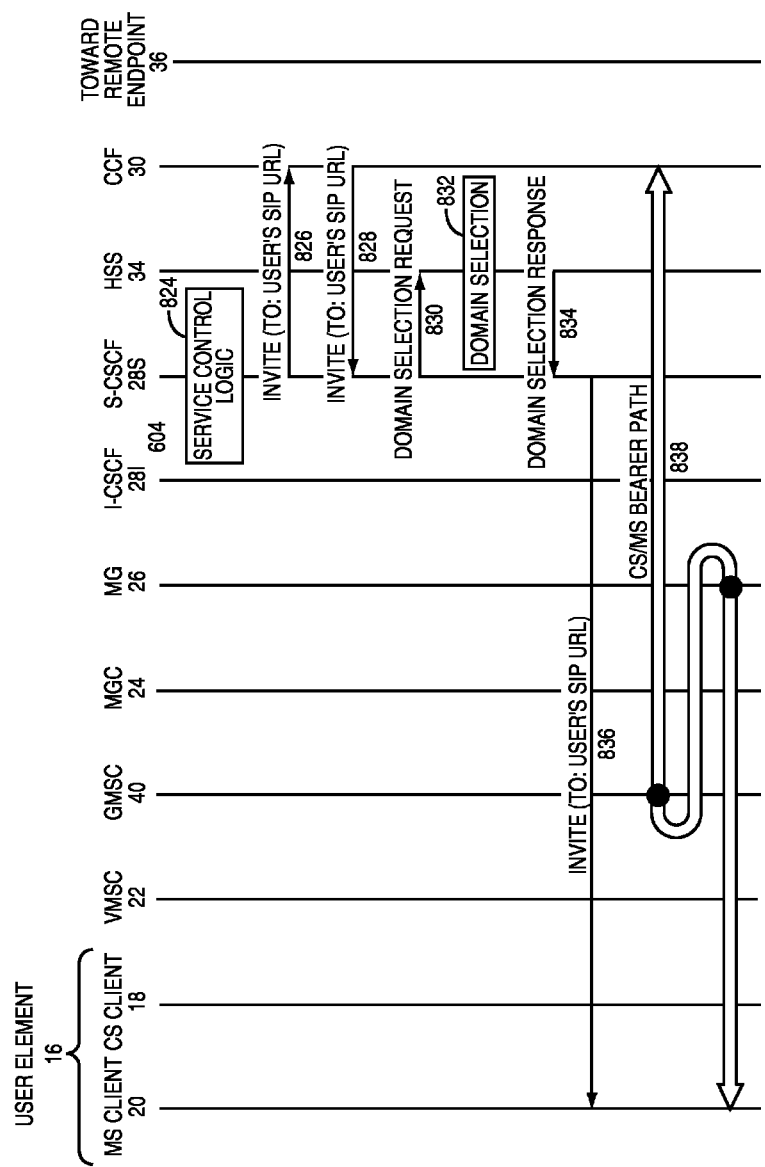

Turning now to FIGS. 10A and 10B, a communication flow is illustrated for terminating an incoming call via the MS 12, wherein the call is originated from the CS 14. In this example, service control is distributed when the call is originally presented. The originating network supporting the remote endpoint 36 will send an IAM to the GMSC 40 in the CS 14 (step 800). The IAM will include the MSISDN for the user element 16. If the call was originated in another MS, the call would have been presented to the media gateway controller 24 as described above. The GMSC 40 will send an SRI message including the MSISDN to the HSS 34 to obtain routing information (step 802). In response to the SRI message, the HSS 34 will identify T-CSI, which provides information necessary to execute services at the GMSC. The T-CSI will be used by the GMSC 40 to execute service logic to assist in terminating the call. The T-CSI is provided back to the GMSC 40 in an SRI Acknowledgement message (step 804). The GMSC 40 will then perform the terminating service logic for the call using the T-CSI (step 806), and send another SRI message to the HSS 34 to suppress the T-CSI (step 808). The T-CSI is suppressed to indicate completion of service logic execution to the HSS and request it to proceed to the next step in routing of the call.

The HSS 34 will then perform the initial domain selection, and determine that the call needs to be anchored at the CCF 30 in the MS 12 (step 810). The HSS 34 will also allocate an IMRN for the user element 16 and pass the IMRN to the GMSC 40 in an SRI Acknowledgment message (step 812). In response, the GMSC 40 will initiate an IAM toward the media gateway controller 24 using the IMRN (step 814). In response, the media gateway controller 24 will process the IAM and initiate an Invite message to the I-CSCF 28I (step 816). The destination in the Invite message will identify the IMRN. The I-CSCF 28I will perform a location query for the user element 16 using the HSS 34 (step 818). The HSS 34 will assign the S-CSCF 28S to the user element 16 and provide corresponding information back to the I-CSCF 28I. The I-CSCF 28I will then send an Invite message to the S-CSCF 28S (step 820). Again, the Invite message will include the IMRN. The S-CSCF 28S will then provide a Profile Query to the HSS 34 to obtain the service profile associated with the user element 16 (step 822). The service profile will include the SIP URL for the user or the user element 16.

The S-CSCF 28S will validate the service profile associated with the user, and execute any termination service control logic for the user (step 824). In this example, the termination service control logic requires invocation of the CCF 30 as a call anchor point. Accordingly, the S-CSCF 28S will forward the Invite message to the CCF 30, which invokes a back-to-back user agent or like function to anchor call signaling for the call (step 826). The CCF 30 will then forward the Invite message back to the S-CSCF 28S (step 828).

At this point, the S-CSCF 28S will employ the HSS 34 to determine the domain to use for routing the incoming call to the user element 16. As such, the S-CSCF 28S may send a Domain Selection Request directly to the HSS 34 (step 830), which will make the domain selection based on the domain selection criteria (step 832) and provide the selected domain back to the S-CSCF 28S in a Domain Selection Response (step 834). Once the requisite signaling is exchanged over the established signaling path, a CS/MS bearer path is established between the MS client 20 of the user element 16 and the remote endpoint 36 via the GMSC 40 and the media gateway 26 associated with the media gateway controller 24 (step 836).

Figure 11:
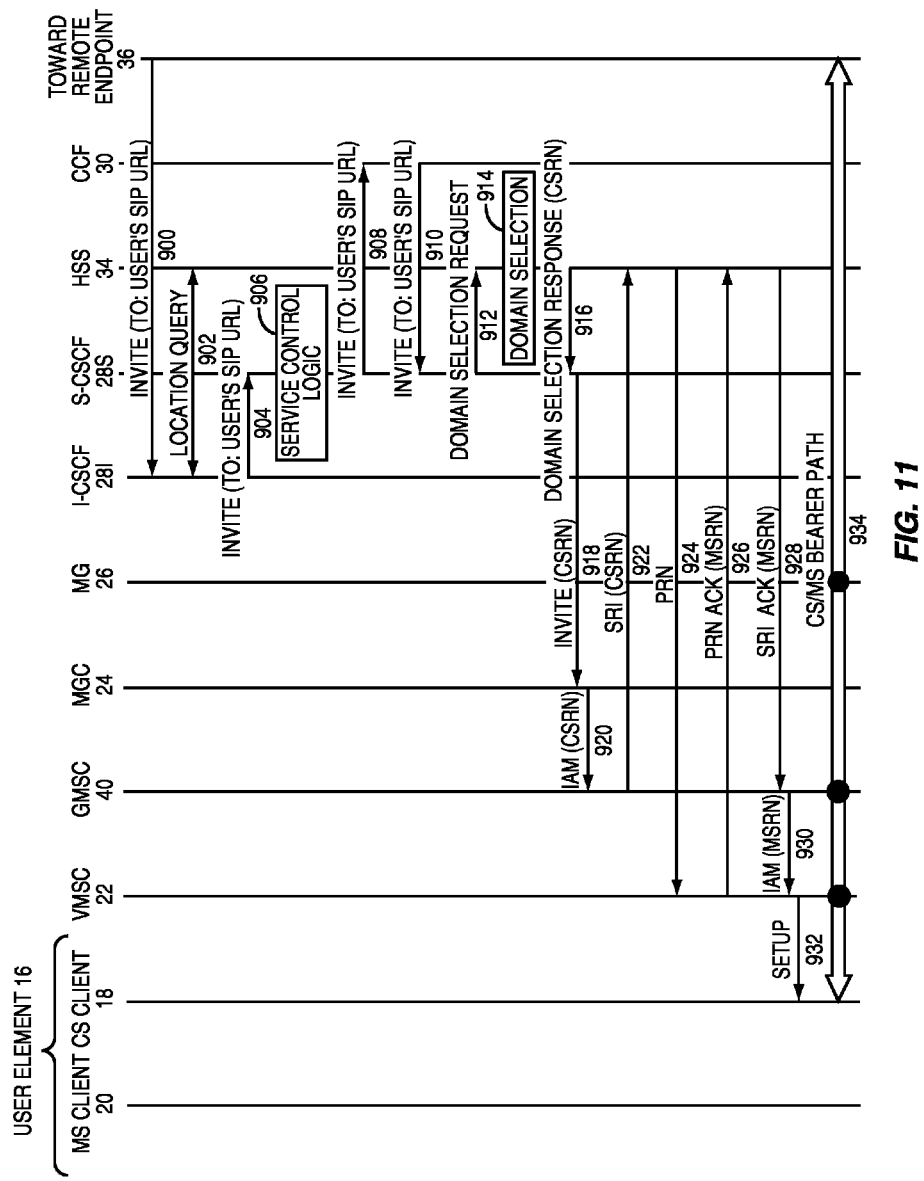
FIG. 11 shows a communication flow illustrating receiving an incoming call via the circuit-switched subsystem according to a fourth embodiment of the present invention.

Turning now to FIG. 11, a communication flow is illustrated wherein an incoming call to the user element 16 is received via the MS 12 and terminated via the CS 14 using the CS client 18 of the user element 16. Initially, an Invite message originated from the remote endpoint 36 is passed to the I-CSCF 28I in the MS 12 (step 900). The Invite message identifies the SIP URL associated with the user of the user element 16 as the intended destination for a call. The I-CSCF 28I may invoke a location query to the HSS 34 to identify the S-CSCF 28S with which the user is registered (step 902). If the user is not registered, the HSS 34 will assign the S-CSCF 28S for the unregistered user. Once the S-CSCF 28S is identified, the Invite message is sent to the S-CSCF 28S for processing according to IMS processing procedures defined in 3GPP TS 23.228 (step 904). The S-CSCF 28S will validate the service profile associated with the user, and execute any termination service control logic for the user (step 906). In this example, the termination service control logic requires invocation of the CCF 30 as a call anchor point. Accordingly, the S-CSCF 28S will forward the Invite message to the CCF 30, which invokes a back-to-back user agent or like function to anchor call signaling for the call (step 908). The CCF 30 will then forward the Invite message back to the S-CSCF 28S (step 910).

At this point, the S-CSCF 28S will employ the HSS 34 to determine the domain to use for routing the incoming call to the user element 16. As such, the S-CSCF 28S may send a Domain Selection Request directly to the HSS 34 (step 912). The HSS 34 will provide domain selection based on the domain selection criteria provided by the S-CSCF 28S known by the HSS 34, or obtained from another entity (step 914). In this instance, the HSS 34 will determine that the call needs to be routed to the user element 16 via the CS 14. The HSS 34 will assign a CS routing number (CSRN) to use for routing the call through the CS 14 to the VMSC 22, and provide the CSRN to the S-CSCF 28S in a Domain Selection Response (step 916).

The S-CSCF 28S will send an Invite message with the CSRN to the media gateway controller 24 (step 918), which will initiate a corresponding IAM with the CSRN to the GMSC 40 (step 920). The CSRN is provisioned on the GMSC 40 to trigger an SRI message to the HSS 34 with the CSRN (step 922). Upon receipt of the SRI message with the CSRN, the HSS 34 will free the CSRN for use for other calls. The HSS 34 will also send a Provide Roaming Number (PRN) message to the VMSC 22 to obtain an MSRN to use for routing the call to the VMSC 22 (step 924). The VMSC 22 will provide an MSRN to the HSS 34 in a PRN Acknowledgment message (step 926). The HSS 34 will send the MSRN to the GMSC 40 in an SRI Acknowledgement message (step 928). Armed with the MSRN, the GMSC 40 can send an IAM toward the VMSC 22 (step 930). Upon receipt of the IAM, the VMSC 22 may send a Setup message to the CS client 18 to present the call (step 932). The requisite call signaling will be provided over the signaling path to establish a CS/MS bearer path between the CS client 18 of the user element 16 and the remote endpoint 36 via the VMSC 22, GMSC 40, and the media gateway 26 associated with the media gateway controller 24 (step 934).

Figure 12:
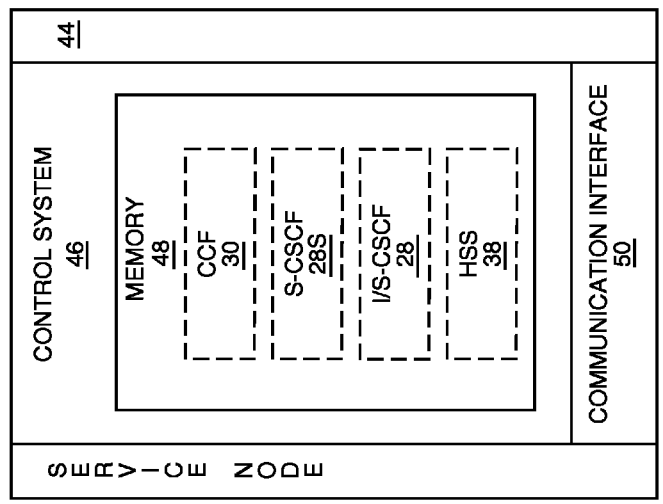
FIG. 12 is a block representation of a service node according to one embodiment of the present invention.

With reference to FIG. 12, a service node 44 is provided according to one embodiment of the present invention. The service node 44 may reside in the MS 12 and include a control system 46 and associated memory 48 to provide the functionality for any one or a combination of the following: the CCF 30, the S-CSCF 28S, the I/S-CSCF 28, the HSS 34, and the DSF 38. The control system 46 will also be associated with a communication interface 50 to facilitate communications with any entity affiliated with the MS 12 or appropriately associated networks. Different service nodes 44 may be used to provide different services or functions.

Figure 13:
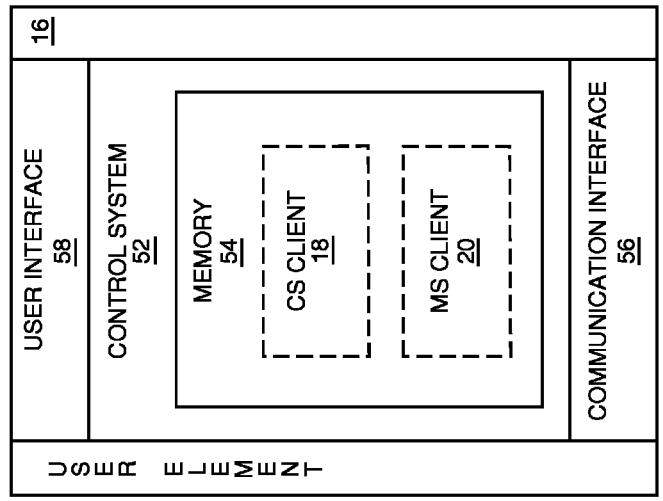
FIG. 13 is a block representation of a user element according to one embodiment of the present invention.

With reference to FIG. 13, a block representation of a user element 16 is provided. The user element 16 may include a control system 52 having sufficient memory 54 to support operation of the CS client 18 and the MS client 20. The control system 52 will cooperate closely with a communication interface 56 to allow the CS client 18 and the MS client 20 to facilitate communications over the CS 14 or the MS 12 as described above. The control system 52 may also be associated with a user interface 58, which will facilitate interaction with the user. The user interface 58 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method comprising:
at a serving call session control function (S-CSCF), receiving signaling for an incoming session intended for a user element and originated from a remote endpoint, wherein the user element is configured to support communications via a plurality of domains through corresponding communication clients;
storing, in a home subscriber server (HSS), current domain information indicating a circuit switched (CS) domain and a multimedia subsystem (MS) domain in which the user element is concurrently registered and prior domain information identifying the CS domain or the MS domain used for establishing a prior call with the user element;
from the S-CSCF, obtaining a selected domain from the plurality of domains for the incoming session from a domain selection function located in the HSS by sending a domain selection query to the domain selection function located in the HSS, wherein the domain selection function in the HSS selects between the CS domain and the MS domain based on the prior domain information and provides a domain selection response to the S-CSCF; and
effecting, by the S-CSCF, routing of the incoming session to the user element via the selected domain contained in the domain selection response, wherein effecting routing of the incoming session to the user element via the selected domain contained in the domain selection response includes routing the incoming session to the user element via the CS domain if the domain selection response contains routing information for the CS domain and routing the incoming session to the user element via the MS domain if the domain selection response contains routing information for the MS domain.

2. The method of claim 1 wherein the S-CSCF is located in the multimedia subsystem.

3. The method of claim 1 wherein the current domain information is stored upon transferring the previously established session from a first domain to a second domain, and the current domain information identifies the second domain.

4. The method of claim 1 wherein the current domain information is stored upon establishing the previously established session.

5. The method of claim 1 wherein the user element is registered with and capable of establishing the incoming session via any one of the plurality of domains.

6. The method of claim 1 further comprising anchoring session signaling at a signaling anchor point in the multimedia subsystem for a first access signaling leg and a remote access signaling leg for a session between the user element and any remote endpoint.

7. The method of claim 1 wherein the plurality of domains comprises a circuit-switched subsystem and the multimedia subsystem.

8. The method of claim 1 wherein the domain selection function is adapted to determine the selected domain from the plurality of domains based on domain selection criterion selected from the group consisting of a domain in which the user element is registered, a domain through which the user element can immediately support communications, a domain used for an existing session, a domain used for a prior session, a service provider preference, a user preference, capabilities of the user element, and a type of session being established.

9. A system comprising:
a home subscriber server (HSS) including:
a communication interface; and
memory storage for storing, in the HSS, current domain information indicating a circuit switched (CS) domain and a multimedia subsystem (MS) domain in which the user element is concurrently registered and prior domain information identifying the CS domain or the MS domain used for establishing a prior call with the user element; and
a serving call session control function (S-CSCF) adapted to:
receive in a multimedia subsystem session signaling for an incoming session intended for a user element and originated from a remote endpoint, wherein the user element is configured to support communications via a plurality of domains through corresponding communication clients;
from the S-CSCF, obtain a selected domain from the plurality of domains for the incoming session from a domain selection function located in the HSS by sending a domain selection query to the domain selection function located in the HSS, wherein the domain selection function in the HSS selects between the CS domain the MS domain based on the prior domain information and provides a domain selection response to the S-CSCF; and
effect, by the S-CSCF, routing of the session to the user element via the selected domain contained in the domain selection response, wherein effecting routing of the incoming session to the user element via the selected domain contained in the domain selection response includes routing the incoming session to the user element via the CS domain if the domain selection response contains routing information for the CS domain and routing the incoming session to the user element via the MS domain if the domain selection response contains routing information for the MS domain.

10. The system of claim 9 wherein the S-CSCF is located in the multimedia subsystem.

11. The system of claim 9 wherein to obtain the selected domain, the control system is further adapted to send a domain request to a domain selection node providing the domain selection function and receive a domain request response identifying the selected domain from the domain selection node.

12. A method comprising:
receiving, in a home subscriber server (HSS) located in a multimedia subsystem and which maintains service information for a user element, from a serving call/session control function in the multimedia subsystem, a domain selection request for an incoming session that is intended for the user element, which is configured to support communications via a plurality of domains through corresponding communication clients;
storing, in the HSS, current domain information indicating a circuit switched (CS) domain and a multimedia subsystem (MS) domain in which the user element is concurrently registered and prior domain information identifying the CS domain or the MS domain used for establishing a prior call with the user element;
selecting, using a domain selection function (DSF) located in the HSS, between the CS domain and the MS domain based on the prior domain information, wherein the plurality of domains includes a multimedia subsystem (MS) domain and a circuit switched (CS) domain; and providing a domain selection response to the serving call/session control function, wherein the serving call session control function effects routing of the incoming session to the user element using the domain selection information contained in the domain selection response, wherein effecting routing of the incoming session to the user element via the selected domain contained in the domain selection response includes routing the incoming session to the user element via the CS domain if the domain selection response contains routing information for the CS domain and routing the incoming session to the user element via the MS domain if the domain selection response contains routing information for the MS domain.

* * * * *